United States Patent
Li et al.

(10) Patent No.: US 11,414,600 B2
(45) Date of Patent: *Aug. 16, 2022

(54) LIQUID CRYSTAL DISPLAY DEVICE

(71) Applicant: Shijiazhuang Chengzhi Yonghua Display Material Co., ltd., Hebei (CN)

(72) Inventors: Jiaming Li, Hebei (CN); Zhian Liang, Hebei (CN); Guoliang Yun, Hebei (CN); Sumin Kang, Hebei (CN); Xuan Zhang, Hebei (CN); Ruixiang Liang, Hebei (CN)

(73) Assignee: SHIJIAZHUANG CHENGZHIYONGHUA DISPLAY MATERIAL CO., LTD., Hebei (CN)

( * ) Notice: Subject to any disclaimer, the term of this patent is extended or adjusted under 35 U.S.C. 154(b) by 128 days.

This patent is subject to a terminal disclaimer.

(21) Appl. No.: 16/405,141

(22) Filed: May 7, 2019

(65) Prior Publication Data
US 2020/0157428 A1 May 21, 2020

(30) Foreign Application Priority Data
Nov. 20, 2018 (CN) .......................... 201811379569.8

(51) Int. Cl.
*C09K 19/56* (2006.01)
*C09K 19/12* (2006.01)
(Continued)

(52) U.S. Cl.
CPC .............. *C09K 19/56* (2013.01); *C09K 19/12* (2013.01); *C09K 19/3003* (2013.01);
(Continued)

(58) Field of Classification Search
CPC ................ C09K 19/12; C09K 19/3003; C09K 19/3028; C09K 19/3066; C09K 19/3098;
(Continued)

(56) References Cited

U.S. PATENT DOCUMENTS

2011/0242468 A1* 10/2011 Choi ................. G02F 1/134309
349/129
2013/0265527 A1* 10/2013 Takeuchi ........... C09K 19/3066
349/86
(Continued)

FOREIGN PATENT DOCUMENTS

| CN | 106883861 A | * | 6/2017 | ........... C07D 307/91 |
| CN | 108264498 A | * | 7/2018 | ........... C07D 409/04 |
| WO | WO-2018155340 A1 | * | 8/2018 | ............. C09K 19/20 |

*Primary Examiner* — Eli D. Strah
(74) *Attorney, Agent, or Firm* — Muncy, Geissler, Olds & Lowe, P.C.

(57) ABSTRACT

The present invention relates to a liquid crystal display device. The liquid crystal display device of the present invention comprises a first substrate, a second substrate, and a liquid crystal composition disposed between said first substrate and said second substrate, wherein said first substrate and said second substrate are disposed in parallel and opposite to each other; alignment layers are disposed on the sides of said first and second substrates that are close to said liquid crystal composition; and said alignment layers are provided with vertical alignment films that allow liquid crystal molecules in said liquid crystal composition to be arranged roughly perpendicular to said first and second substrates, with said liquid crystal molecules having a pretilt angle of 88.5° to 89.5°.

10 Claims, 1 Drawing Sheet

(51) Int. Cl.
*C09K 19/30* (2006.01)
*C09K 19/34* (2006.01)
*C09K 19/44* (2006.01)
C09K 19/04 (2006.01)
G02F 1/1337 (2006.01)

(52) U.S. Cl.
CPC ...... *C09K 19/3028* (2013.01); *C09K 19/3066* (2013.01); *C09K 19/3098* (2013.01); *C09K 19/3402* (2013.01); *C09K 19/3491* (2013.01); *C09K 19/44* (2013.01); *B32B 2457/20* (2013.01); *B32B 2457/202* (2013.01); *C09K 2019/0448* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3021* (2013.01); *C09K 2019/3025* (2013.01); *C09K 2019/3036* (2013.01); *C09K 2019/3422* (2013.01); *C09K 2323/00* (2020.08); *C09K 2323/02* (2020.08); *C09K 2323/03* (2020.08); *G02F 1/1337* (2013.01); *G02F 1/133742* (2021.01); *G02F 1/133746* (2021.01)

(58) Field of Classification Search
CPC ............ C09K 19/3402; C09K 19/3491; C09K 19/44; C09K 19/56; C09K 2323/00; C09K 2323/02; C09K 2323/03; C09K 2019/0448; C09K 2019/122; C09K 2019/123; C09K 2019/3004; C09K 2019/3009; C09K 2019/301; C09K 2019/3016; C09K 2019/3021; C09K 2019/3025; C09K 2019/3027; C09K 2019/3036; C09K 2019/3408; C09K 2019/3422; G02F 1/1337; G02F 1/133711; G02F 1/133723; G02F 2001/133742; G02F 2001/133746; G02F 1/133742; G02F 1/133746; B32B 2457/20; B32B 2457/202

See application file for complete search history.

(56) References Cited

U.S. PATENT DOCUMENTS

| | | | |
|---|---|---|---|
| 2015/0152330 A1* | 6/2015 | Yun | C09K 19/30 252/299.63 |
| 2015/0259602 A1* | 9/2015 | Reiffenrath | C07D 307/91 252/299.61 |
| 2015/0299161 A1* | 10/2015 | Reiffenrath | C07D 409/04 252/299.61 |
| 2016/0230092 A1* | 8/2016 | Li | C09K 19/3402 |
| 2020/0032143 A1* | 1/2020 | Takata | G02F 1/13 |
| 2020/0157429 A1* | 5/2020 | Li | C09K 19/12 |

* cited by examiner

LIQUID CRYSTAL DISPLAY DEVICE

TECHNICAL FIELD

The present invention relates to the technical field of liquid crystal displays. More particularly, the invention relates to a liquid crystal display device.

BACKGROUND ART

With the development of display technologies, flat panel display devices such as liquid crystal display (LCD) devices are widely used in various consumer electronics such as mobile phones, televisions, personal digital assistants, digital cameras, notebook computers, desktop computers due to having the advantages of high image qualities, power saving, thin bodies, a wide range of applications, etc., and have become the mainstream in display devices.

In a liquid crystal display device of a PSVA (Polmer Stabilized Vertivally Aligned) display mode, a liquid crystal layer contains a polymerizable compound acting as a reactive mesogen (RM), wherein by means of the polymerization of the RM, liquid crystal molecules are given a certain pretilt angle, such that a vertical alignment effect is produced. As for liquid crystal display devices of the PSVA mode, as the living standards of people improve, the demand for liquid crystal display devices with a high contrast ratio and a short response time is more and more increasing; however, no liquid crystal display device having a high contrast ratio and a short response time has been disclosed in the prior art.

SUMMARY OF THE INVENTION

In order to obtain a liquid crystal display device having a contrast ratio as high as possible on the basis of maintaining a response time as short as possible, the inventors of the present application have conducted intensive studies and found that this object can be achieved by means of the liquid crystal display device of the present invention, thereby completing the present invention.

The object of the present invention is to provide a liquid crystal display device comprising a first substrate, a second substrate, and a liquid crystal composition disposed between said first substrate and said second substrate, wherein said first substrate and said second substrate are disposed in parallel and opposite to each other; alignment layers are disposed on the sides of said first and second substrates that are close to said liquid crystal composition; said alignment layers are provided with vertical alignment films that allow liquid crystal molecules in said liquid crystal composition to be arranged roughly perpendicular to said first or second substrate, with said liquid crystal molecules having a pretilt angle of 88.5° to 89.5°; and said liquid crystal composition comprises one or more compounds represented by formula I and one or more compounds represented by formula II:

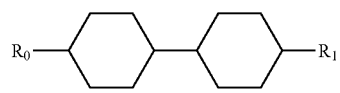

wherein $R_0$ represents an alkyl group having a carbon atom number of 1-10, an alkoxy group having a carbon atom number of 1-10, an alkenyl group having a carbon atom number of 2-10, or an alkenoxy group having a carbon atom number of 3-8, and $R_1$ represents an alkenyl group having a carbon atom number of 2-10; and

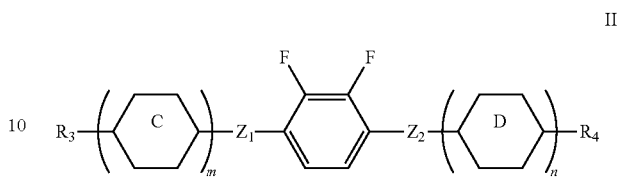

wherein $R_3$ and $R_4$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more non-neighboring —$CH_2$— in the groups represented by $R_3$ and $R_4$ are each independently optionally substituted with cyclopentylene, cyclobutylene or cyclopropylene;

$Z_1$ and $Z_2$ each independently represent a single bond, —$CH_2CH_2$— or —$CH_2O$—;

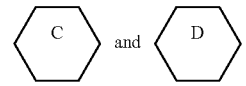

each independently represent 1,4-phenylene, 1,4-cyclohexylene, fluorinated 1,4-phenylene or 1,4-cyclohexenylene;

m represents 1 or 2; and n represents 0, 1 or 2.

In the present invention, by using the vertical alignment films and the liquid crystal composition that cooperate with each other, a liquid crystal display device having a significantly improved contrast ratio on the basis of a wider range of nematic phase temperature, a suitable birefringence anisotropy Δn, a high charge retention ratio and a response time as short as possible is obtained.

DETAILED DESCRIPTION OF EMBODIMENTS

[Liquid Crystal Display Device]

Figure 1:
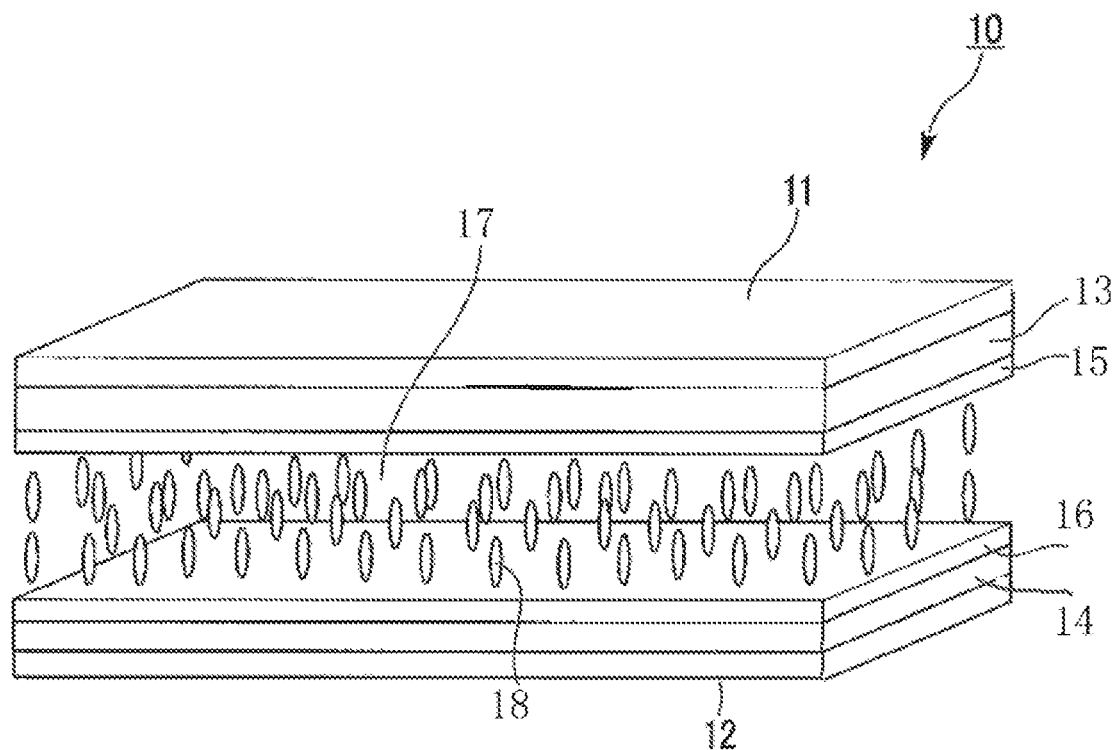
FIG. 1 represents a schematic view of one embodiment of the liquid crystal display element of the present invention.
Figure 2:
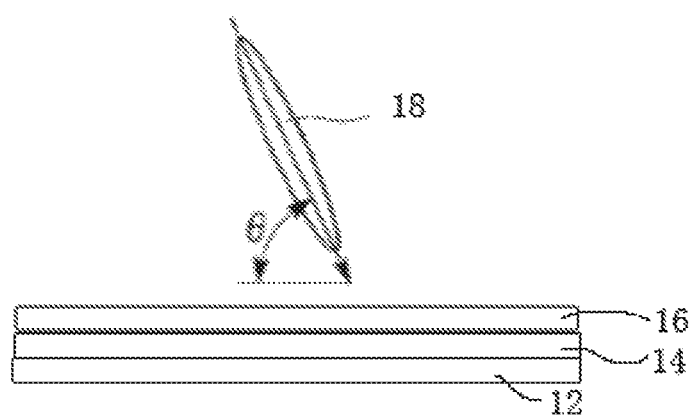
FIG. 2 represents a view regarding the definition of the pretilt angle in the liquid crystal display element of the present invention.

The liquid crystal display device of the present invention comprises a first substrate, a second substrate, and a liquid crystal composition disposed between the first substrate and the second substrate, wherein the first substrate and the second substrate are disposed in parallel and opposite to each other; alignment layers are disposed on the sides of the first and second substrates that are close to the liquid crystal composition; the alignment layers are provided with vertical alignment films that allow liquid crystal molecules in the liquid crystal composition to be arranged roughly perpendicular to the first and second substrates, with the liquid crystal molecules having a pretilt angle of 88.5° to 89.5°; and the liquid crystal composition comprises one or more compounds represented by formula I and one or more compounds represented by formula II:

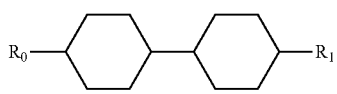
I wherein $R_0$ represents an alkyl group having a carbon atom number of 1-10, an alkoxy group having a carbon atom number of 1-10, an alkenyl group having a carbon atom number of 2-10, or an alkenoxy group having a carbon atom number of 3-8, and $R_1$ represents an alkenyl group having a carbon atom number of 2-10; and

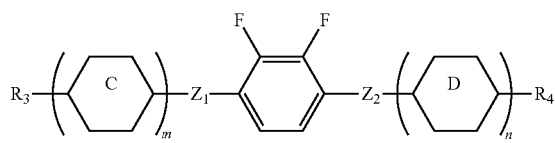
II wherein $R_3$ and $R_4$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more non-neighboring —$CH_2$— in the groups represented by $R_3$ and $R_4$ are each independently optionally substituted with cyclopentylene, cyclobutylene or cyclopropylene;

$Z_1$ and $Z_2$ each independently represent a single bond, —$CH_2CH_2$— or —$CH_2O$—;

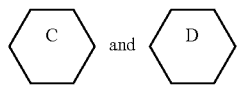

each independently represent 1,4-phenylene, 1,4-cyclohexylene, fluorinated 1,4-phenylene or 1,4-cyclohexenylene;

m represents 1 or 2; and n represents 0, 1 or 2.

In one embodiment of the liquid crystal display device of the present invention, the above-mentioned first substrate is a color film substrate, and the above-mentioned second substrate is a thin film transistor substrate; in addition, the above-mentioned first substrate is provided with a common electrode, and the above-mentioned second substrate is provided with a pixel electrode.

The above-mentioned first substrate and the above-mentioned second substrate may be, for example, a glass substrate or a plastic substrate. The plastic substrate may be, for example, formed of a material such as an acrylic resin, a methacrylic resin, a cyclic olefin resin, etc. The common electrode and the pixel electrode are formed of a transparent material such as indium tin oxide (ITO). The pixel electrode is controlled by a thin film transistor unit on the second substrate. By applying a voltage to the electrodes on the two oppositely disposed substrates, liquid crystal molecules in the liquid crystal composition disposed between the two substrates are rotated, thereby converting an optical signal.

In the liquid crystal display device of the present invention, the above-mentioned alignment layers have a thickness of 30 nm to 120 nm, preferably 40 nm to 60 nm, and the alignment layers are formed of, for example, a polyimide, a polyamide, a polysiloxane etc., in which the polyimide is preferred. In another aspect, in the case of using a polysilane-based alignment layer, a siloxane-dissolving polysiloxane solution may be used. In the liquid crystal display device of the present invention, in order to prevent a decreased liquid crystal display device yield caused by dust particles, electrostatic residue, etc. generated during the process of the rubbing of the alignment layers, neither of the alignment layers undergoes a rubbing process; instead, the liquid crystal molecules in the liquid crystal composition are aligned by means of the vertical alignment films, as mentioned hereinafter, disposed between the alignment layers and the liquid crystal composition. In the present invention, the arrangement of the liquid crystal molecules in the liquid crystal composition being roughly perpendicular to the first and second substrates means that the included angle formed between the liquid crystal molecules in the liquid crystal composition and the planes of the first and second substrates is close to 90°, which angle is also referred to as the pretilt angle of the liquid crystal molecules. The above-mentioned pretilt angle of the liquid crystal molecules refers to an angle formed between the liquid crystal molecules with respect to the plane of the first or second substrate under the condition of no voltage being applied to the liquid crystal display device, and the angle is set to 88.5° to 89.5°. By means of the vertical alignment films and the liquid crystal composition that cooperate with each other, the liquid crystal molecules are given a suitable pretilt angle, thereby obtaining a liquid crystal display device with a significantly improved contrast ratio on the basis of maintaining a response time as short as possible.

In the liquid crystal display device of the present invention, in order to maintain a contrast ratio as high a possible on the basis of maintaining a response time as short as possible, the above-mentioned pretilt angle is preferably 89.1° to 89.5°. As the pretilt angle continuously increases, the contrast ratio increases; however, the PSVA liquid crystal display device is a vertical alignment-type liquid crystal display device, that is, the liquid crystal molecules are roughly perpendicular to the substrates when no voltage is applied, and an increase in the pretilt angle also has a certain negative influence on the response time; therefore, for a balance between the response time and contrast ratio of the liquid crystal display device, a greater contrast ratio is obtained with less sacrifice of the response time, and the pretilt angle is further preferably 89.2° to 89.3°.

[Vertical Alignment Film]

In the liquid crystal display device of the present invention, the above-mentioned vertical alignment films are thin films formed by polymerizing a polymerizable compound having a polymerizable group. The above-mentioned polymerizable compound may be selected, for example, from one or more compounds of formula IV:

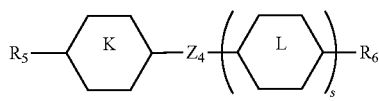

IV wherein $R_5$ and $R_6$ each independently represent $P_3$—$Sp_3$-, H, Cl, F, or an alkyl having a carbon atom number of 1-12; one or more non-neighboring —$CH_2$— groups in said alkyl having a carbon atom number of 1-12 is optionally replaced by —O—, —$CH_2$=$CH_2$—, —CO—, —OCO— or —COO—; wherein at least one of $R_5$ and $R_6$ represents $P_3$—$Sp_3$-;

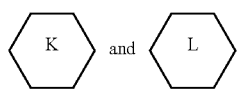

each independently represent phenylene, a phenylene group optionally substituted with $P_3$—$Sp_3$-, Cl, F, an alkyl having a carbon atom number of 1-12 or an alkoxy group having a carbon atom number of 1-12, or indanyl, wherein one or two non-neighboring —$CH_2$— groups in said alkyl having a carbon atom number of 1-12 and said alkoxy group having a carbon atom number of 1-12 are optionally replaced by —O—, —$CH_2$=$CH_2$—, —CO—, —OCO— or —COO—; furthermore,

is bonded to $R_5$ at any position of

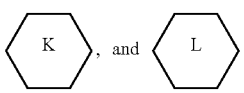

is bonded to $R_6$ at any position of

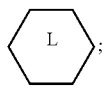

s represents 0, 1 or 2;
$P_3$ represents a polymerizable group; $Sp_a$ represents a spacer group; and
$Z_4$ represents a single bond, —COO—, —$CH_2$O— or —$CH_2CH_2$—.

The compound represented by formula IV may be a polymerizable compound and functions as a reactive mesogen (RM), and specific examples of the compound represented by formula IV include, for example, one of or a combination of some of an acrylate, an acrylate derivative, a methacrylate, a methacrylate derivative, styrene, a styrene derivative, and an epoxy resin. The compound represented by formula IV is capable of polymerizing or cross-linking polymerizable groups at both ends by absorbing light energy to form a vertical alignment film having protrusions on the alignment layer, thereby providing a sustained and stable pretilt angle for the liquid crystal molecules.

Optionally, the above-mentioned polymerizable compound is selected from the group consisting of compounds represented by the formulas IV1 to IV8:

IV1

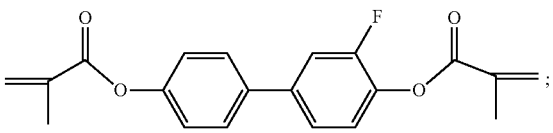

IV2

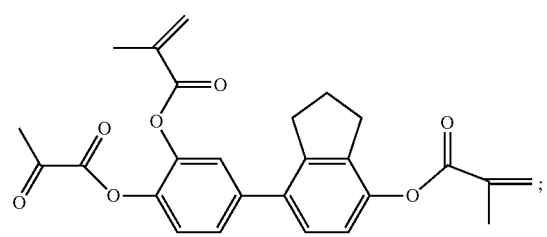

IV3

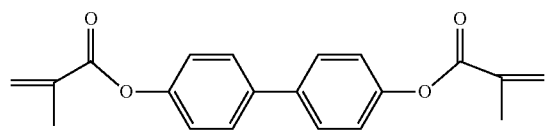

IV4

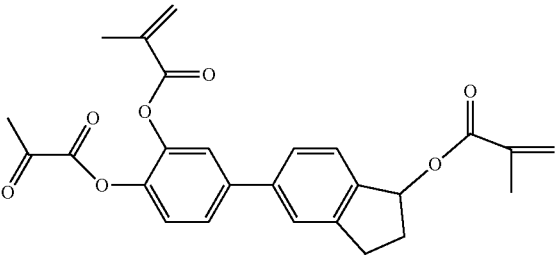

IV5

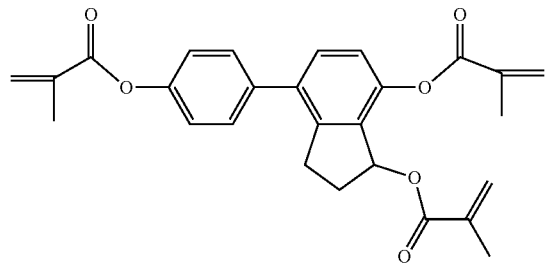

IV6

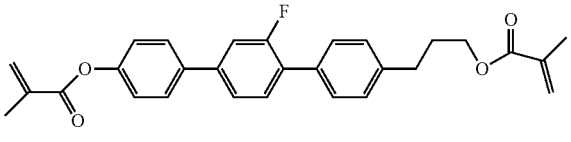

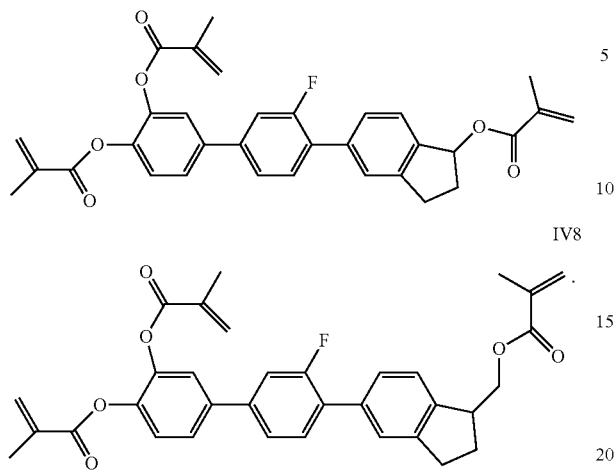

IV7

IV8

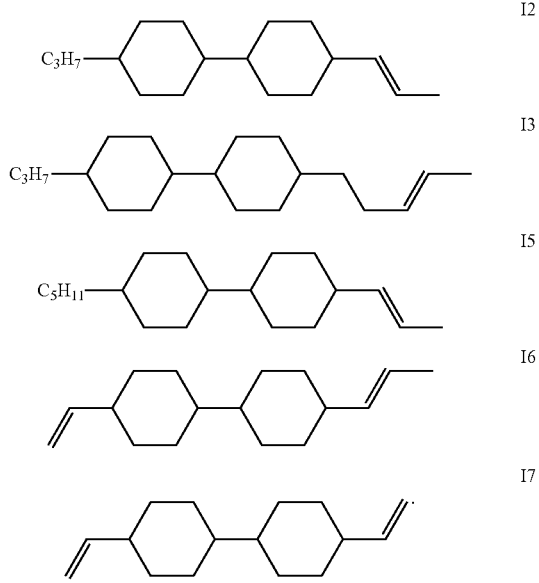

I2

I3

I5

I6

I7

On the basis that the mass of the liquid crystal composition excluding the polymerizable compound represented by formula IV is 100%, the mass percentage content of the polymerizable compound represented by formula IV is set to 0.01%-1%, preferably 0.03%-0.5%. From the viewpoint of not causing defective displaying with afterimage in the liquid crystal display device, the content of the compound represented by formula IV above is preferably 1% or less, and further preferably 0.5% or less. In addition, from the viewpoint of the polymerization of the vertical alignment film to form a polymer thin film and thus align the liquid crystal molecules, and the prevention of the alignment layers from a decreased liquid crystal display device yield caused by dust particles, electrostatic residue, etc. generated during the process of the displaying of the liquid crystal display devices, the content of the polymerizable compound represented by formula IV above is preferably 0.01% or more, and further preferably 0.03% or more.

[Liquid Crystal Composition]

In the liquid crystal composition used in the liquid crystal display device of the present invention, the compound represented by formula I above may be selected from the group consisting of the compounds represented by formulas I1 to I7:

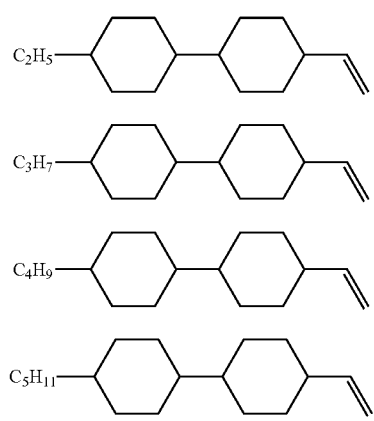

I4

I1

I4

I4

The compound represented by formula I has the characteristics of a low rotary viscosity and a good mutual solubility with other compounds. A lower rotary viscosity is more conducive to improve the response speed of the liquid crystal composition.

In the liquid crystal display device of the present invention, the one or more compounds represented by formula II above may be selected, for example, from the group consisting of the compounds represented by formulas II1 to II14:

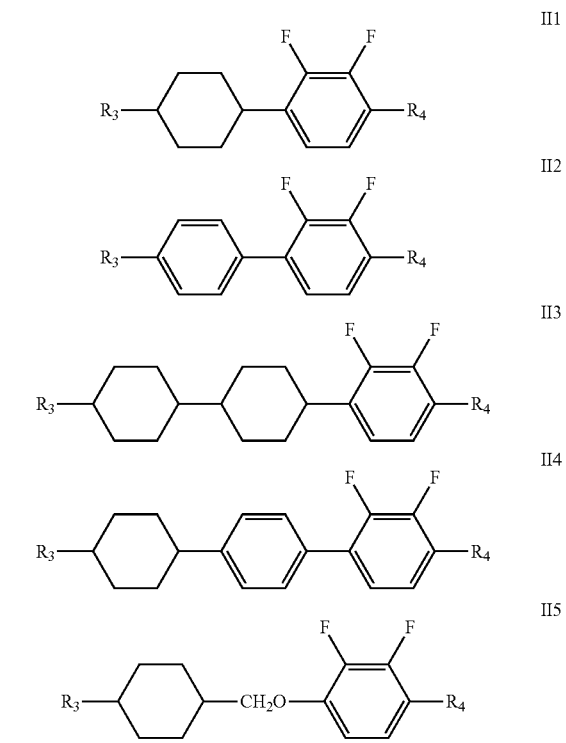

II1

II2

II3

II4

II5

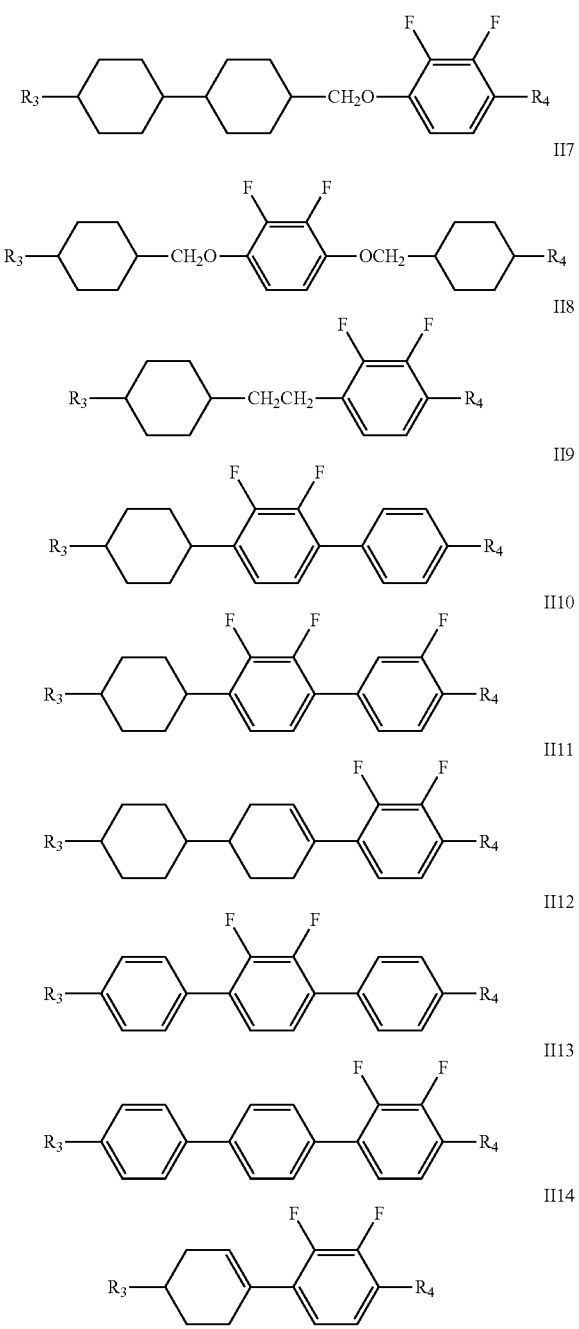

wherein $R_3$ and $R_4$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more non-neighboring —$CH_2$— in the groups represented by $R_3$ and $R_4$ are each independently optionally substituted with cyclopentylene, cyclobutylene or cyclopropylene.

The compound represented by formula II has a negative dielectric anisotropy, and the drive voltage of the liquid crystal composition may be adjusted by containing the compound represented by formula II in the liquid crystal composition.

Examples of the above-mentioned groups obtained by substituting one or more non-neighboring —$CH_2$— in the groups represented by in the alkyl group having a carbon atom number of 1-10 with cyclopropylene, cyclobutylene or cyclopentylene include cyclopropyl, cyclobutyl, cyclopentyl, methylcyclopropylene, ethylcyclopropylene, propylcyclopropylene, isopropylcyclopropylene, n-butylcyclopropylene, isobutylcyclopropylene, t-butylcyclopropylene, methylcyclobutylene, ethylcyclobutylene, propylcyclobutylene, iso-propylcyclobutylene, n-butylcyclobutylene, iso-butylcyclobutylene, t-butylcyclobutylene, methylcyclopentylene, ethylcyclopentylene, propylcyclopentylene, iso-propylcyclopentylene, n-butylcyclopentylene, iso-butylcyclopentylene etc. Among the groups represented by $R_3$ and $R_4$ above, cyclopropyl, cyclobutyl or cyclopentyl is preferred from the viewpoint of the rotary viscosity, solubility and clearing point of the liquid crystal compound.

Optionally, the above-mentioned liquid crystal composition may be a negative dielectric anisotropic liquid crystal composition.

The percentage content of the compound represented by formula I in the total mass percentage of the liquid crystal composition is preferably 10%-40%, and further preferably 10%-30%; and the percentage content of the compound represented by formula II in the total mass percentage of the liquid crystal composition is preferably 25%-90%, and further preferably 70%-90%.

In some embodiments of the liquid crystal display device of the present invention, optionally, the above-mentioned liquid crystal composition may further comprise one or more compounds represented by formula III:

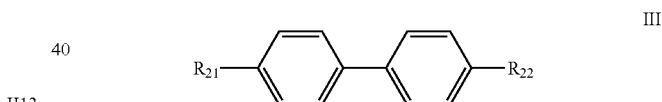

wherein $R_{21}$ and $R_{22}$ each independently represent an alkyl group having a carbon atom number of 1-10, an alkoxy group having a carbon atom number of 1-10, an alkenyl group having a carbon atom number of 2-10, or an alkenoxy group having a carbon atom number of 3-8.

The above-mentioned one or more compounds represented by formula III may be selected from the group consisting of compounds represented by formulas III1 to III8:

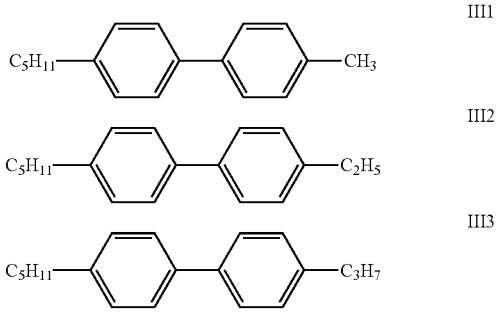

-continued

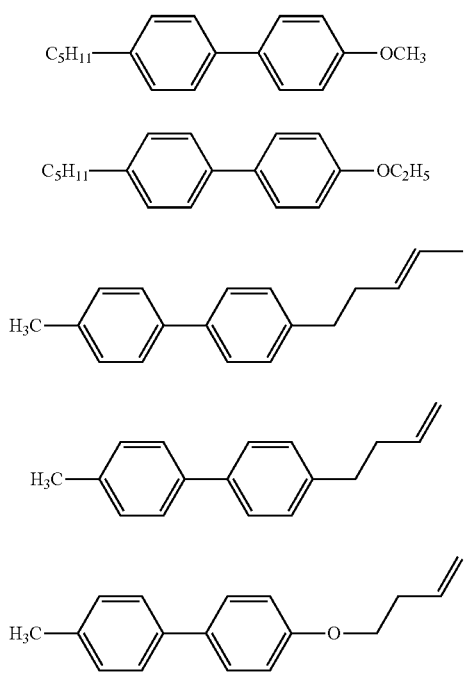

The compound represented by formula III has larger optical anisotropy, and by containing the compound represented by formula III in the liquid crystal composition of the present invention, the liquid crystal composition can be provided with different optical anisotropy parameters to obtain liquid crystal display devices with different optical retardation designs.

The mass percentage content of the total amount of the compound represented by formula III in the liquid crystal composition is preferably 5%-30%, further preferably 10%-20%.

In some embodiments of the liquid crystal display device of the present invention, optionally, the above-mentioned liquid crystal composition further comprises one or more compounds represented by formula V:

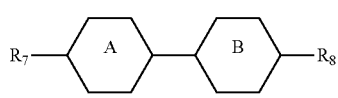

wherein $R_7$ and $R_8$ each independently represent an alkyl group having a carbon atom number of 1-10, an alkoxy group having a carbon atom number of 1-10, an alkenyl group having a carbon atom number of 2-10, or an alkenoxy group having a carbon atom number of 3-8;

represents

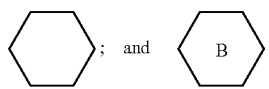

represents

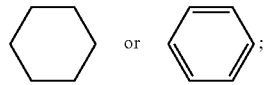 [SMILES: C1CCCCC1 ; c1ccccc1]

where

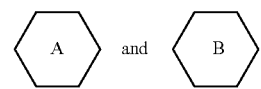

both represent

$R_8$ does not represent an alkenyl group.

The above-mentioned one or more compounds represented by formula V may be selected from the group consisting of compounds represented by formulas V1 to V14:

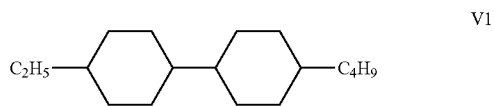

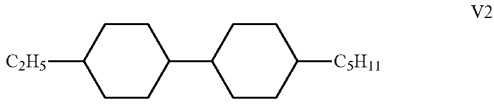

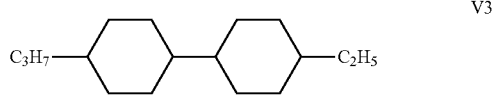

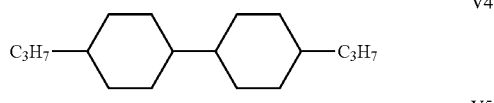

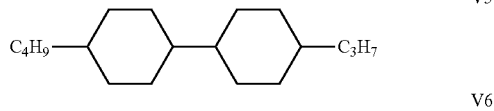

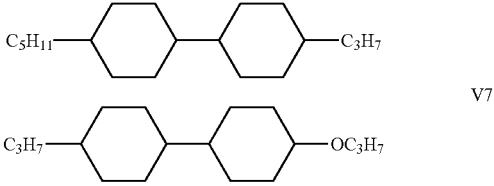

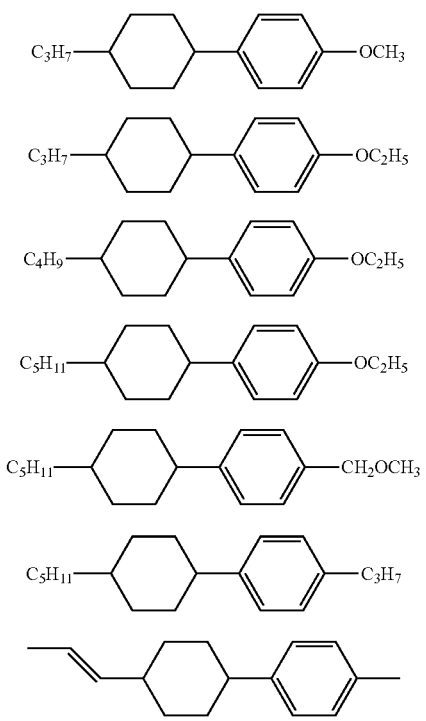

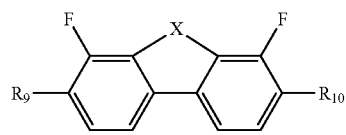

The mass percentage content of the total amount of the compound represented by formula V in the liquid crystal composition is preferably 5%-30%, further preferably 10%-20%.

In some embodiments of the liquid crystal display device of the present invention, optionally, the above-mentioned liquid crystal composition further comprises one or more compounds represented by formula VI:

VI wherein $R_9$ and $R_{10}$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more non-neighboring —$CH_2$— groups in the groups represented by $R_9$ and $R_{10}$ are each independently optionally substituted with cyclopentylene, cyclobutylene or cyclopropylene; and X represents O, S or —$CH_2O$—.

Optionally, the above-mentioned one or more compounds represented by formula VI are selected from the group consisting of compounds represented by formulas VI1 to VI9:

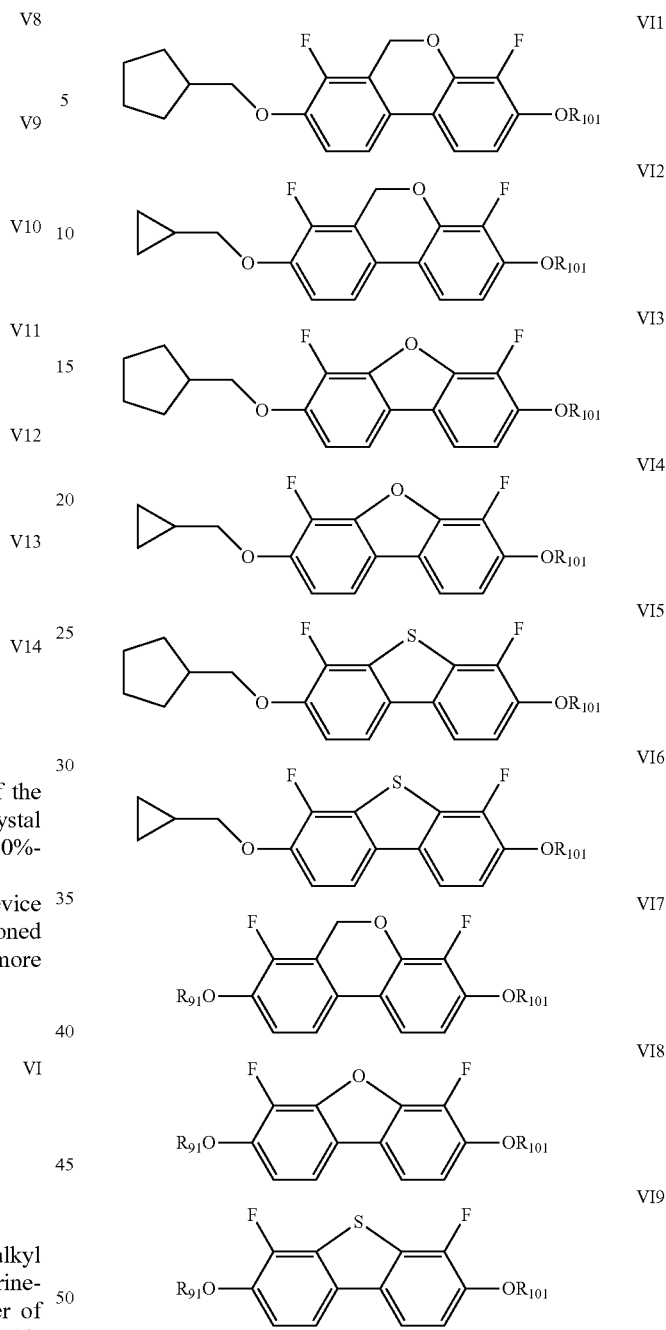

wherein $R_{91}$ and $R_{101}$ each independently represent an alkyl group having a carbon atom number of 2-6.

The above-mentioned compound represented by formula VI has a larger negative dielectric anisotropy, and by containing the above-mentioned compound represented by formula VI in the liquid crystal composition, the drive voltage of the liquid crystal display device of the present invention is advantageously lowered. The compounds of formulas VI1 to VI6 have a cyclopentyl or cyclopropyl group on one side, have a better mutual solubility with other compounds than the compounds of formulas VI7 to VI9, and are therefore more preferable.

The mass percentage content of the total amount of the above-mentioned one or more compounds represented by formula VI in the liquid crystal composition is preferably 1%-20%, further preferably 5%-10%.

In some embodiments of the liquid crystal display device of the present invention, optionally, the above-mentioned liquid crystal compounds may further comprise one or more compounds represented by formula VII:

VII wherein $R_{11}$ and $R_{12}$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more non-neighboring —$CH_2$— groups in the groups represented by $R_{11}$ and $R_{12}$ are optionally substituted with cyclopentylene, cyclobutylene or cyclopropylene; and

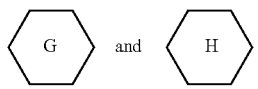

each independently represent

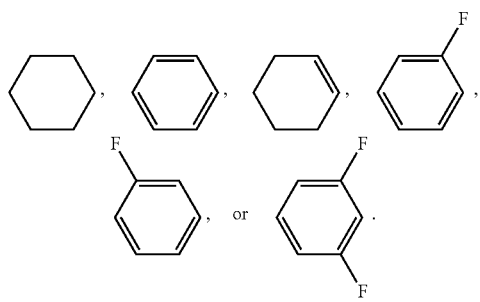

The above-mentioned one or more compounds represented by formula VII may be selected from the group consisting of compounds represented by formulas VII1 to VII7:

VII1

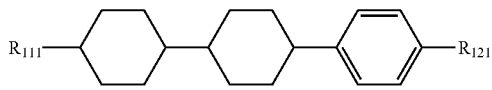

VII2

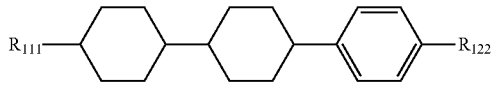

VII3

-continued

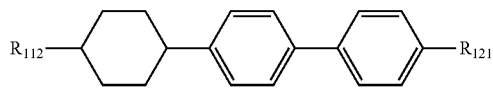

VII4

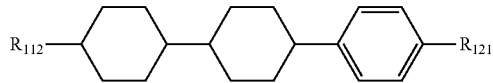

VII5

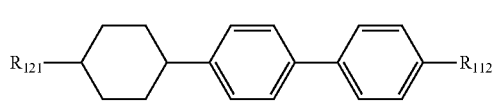

VII6

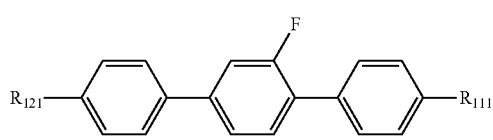

VII7 wherein $R_{121}$ represents an alkyl group having a carbon atom number of 1-6, $R_{122}$ represents an alkoxy group having a carbon atom number of 1-6, $R_{111}$ represents an alkyl group having a carbon atom number of 2-6, and $R_{112}$ represents an alkenyl group having a carbon atom number of 2-6.

Where the end chain of the above compound represented by formula VII is the alkenyl group $R_{112}$, the liquid crystal compound has a higher clearing point and elastic constant, especially flexural elastic constant $K_{33}$, and is advantageous for improving the parameter performance of the liquid crystal composition, and is therefore more preferable.

The mass percentage content of the total amount of the above-mentioned one or more compounds represented by formula VII in the liquid crystal composition is preferably 1%-30%, further preferably 5%-20%.

In some embodiments of the liquid crystal display device of the present invention, optionally, the above-mentioned liquid crystal compounds may further comprise one or more compounds represented by formula VIII:

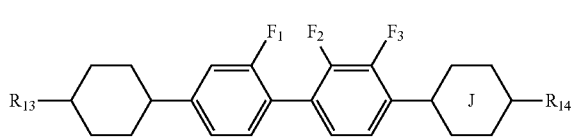

VIII wherein $R_{13}$ and $R_{14}$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8;

represents

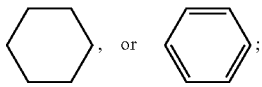

and

F₁, F₂ and F₃ each independently represent H or F, with F₂ and F₃ not simultaneously being F.

The above-mentioned one or more compounds represented by formula VIII are preferably selected from the group consisting of compounds represented by formulas VIII1 to VIII4:

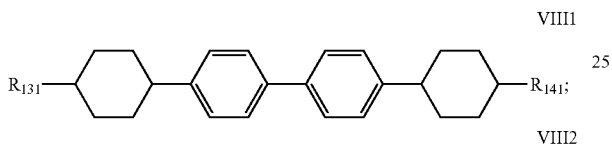

VIII1

VIII2

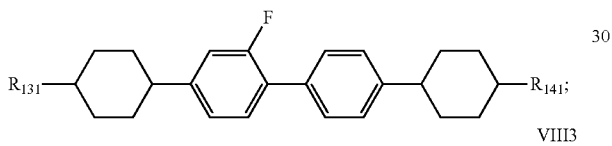

VIII3

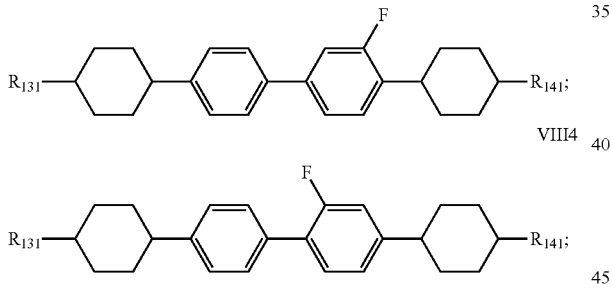

VIII4 wherein $R_{131}$ and $R_{141}$ each independently represent an alkyl group having a carbon atom number of 1-6.

The above-mentioned compounds represented by formulas VIII1 to VIII4 have a high clearing point, generally higher than 200° C., which can more significantly improve the clearing point of the liquid crystal composition of the present invention.

The mass percentage content of the total amount of the above-mentioned one or more compounds represented by formula VIII in the liquid crystal composition is preferably 1%-10%, further preferably 2%-5%.

In some embodiments of the liquid crystal display device of the present invention, optionally, dopants with various functions may also be added to the above-mentioned liquid crystal composition; in the case of containing a dopant, the mass percentage of the content of the dopant in the liquid crystal composition is preferably between 0.01%-1%; and examples of such dopants include an antioxidant, an ultraviolet absorber, and a chiral agent.

Examples of the antioxidant and the ultraviolet absorber include:

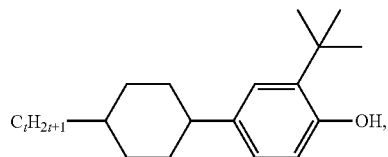

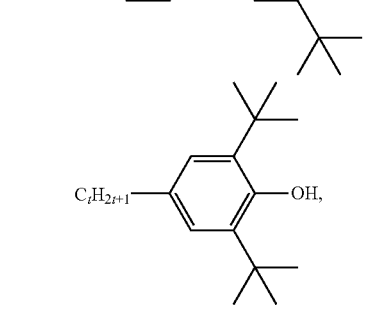

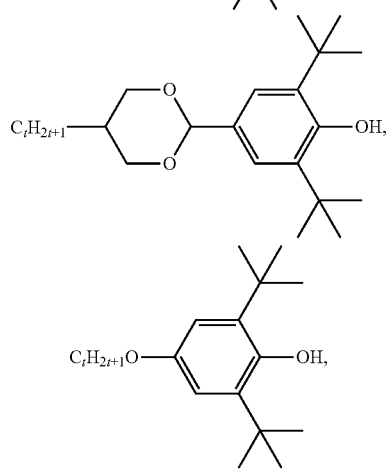

and t represents an integer of 1-10.

[Method for Manufacturing Liquid Crystal Display Element]

Next, the method for manufacturing a liquid crystal display element of the present invention is described with reference to FIG. 1.

An alignment layer forming material is applied to a plane, on which a common electrode (not shown in FIG. 1) is formed, of a first substrate 11 and a plane, on which a pixel electrode (not shown in FIG. 1) is formed, of a second substrate 12, and cured by heating to respectively form alignment layers 13 and 14.

The constituent material of the alignment layers may be, for example, a polyimide or a polysiloxane; and in the case of the polyimide, the above-mentioned alignment layer forming material may, for example, be a mixture of a tetracarboxylic dianhydride and a diisocyanate, a polyamic acid, or a solution of a polyimide dissolved or dispersed in a solvent. In the case of the polysiloxane, the above-mentioned alignment layer forming material may, for example, be a silicon compound having an alkoxy group, a silicon compound having a halogenated alkoxy group. If necessary, a compound having photocrosslinkability, a photopolymerization initiator, a solvent, etc. may be added to the alignment layer forming material.

The alignment layers 13 and 14 are formed by means of heat curing without undergoing a rubbing process. After the alignment layers 13 and 14 are formed, spacers (not shown in FIG. 1) are spread on the surface of the alignment layer 14 of the second substrate 12, and a border adhesive is applied along the edge of the first substrate 11 and cured by heating. It is to be noted that the spacers may also be spread on the first substrate. Which substrate the spacers are spread on mainly depends on which substrate is placed in the lower layer during the device preparation process, and the spacer is generally spread on the lower substrate.

Then, the first substrate 11 and the second substrate 12 are bonded, with spacers therebetween, in a manner such that the alignment layer 13 and the alignment layer 14 are bonded to each other to form a structure having an interlayer space 17, and a liquid crystal composition and a polymerizable compound (not shown in FIG. 1) for forming vertical alignment films 15 and 16 described later are injected into the interlayer space 17 formed by the first substrate 11 and the second substrate 12. A frame is sealed by means of heating, so that the liquid crystal composition and the polymerizable compound are sealed between the first substrate 11 and the second substrate 12.

Next, a voltage is applied between the common electrode and the pixel electrode by means of a voltage applying device (not shown in FIG. 1), with the voltage being 12-20 V, and the applied electric field may be a square wave alternating electric field of, for example, a frequency of 60 Hz. During the application of the voltage, ultraviolet light irradiation is carried out, and the ultraviolet light irradiation is divided into two stages. The first stage of ultraviolet light irradiation (UV1) is carried out to polymerize the polymerizable compound to form the vertical alignment films 15 and 16, so that the liquid crystal molecules 18 in the liquid crystal composition form a pretilt angle of 88.5°-89.5°. The ultraviolet light has a wavelength of 360 nm to 370 nm, the ultraviolet light irradiation time may be 85-115 s, and the ultraviolet light irradiance is 60-72 mw/cm$^2$. After the first stage of ultraviolet light irradiation (UV1) is completed, the second stage of ultraviolet light irradiation (UV2) is carried out to slowly polymerize the polymerizable compound which is not polymerized, so that no polymerizable compound residue is present in the liquid crystal composition. The ultraviolet light in the second stage of ultraviolet light irradiation (UV2) has a wavelength of 360 nm-370 nm, the ultraviolet light irradiation time may be 100-150 min, and the ultraviolet light irradiance is 3-8 mw/cm$^2$. The use of UV2 within this range of intensity generally enables slow complete polymerization of the polymerizable compound which is not polymerized, and since the polymerization of the polymerizable compound is slow, this process does not affect the pretilt angle that has been formed. Thus, the liquid crystal display device 10 can be obtained.

EXAMPLES

In order to illustrate the present invention more clearly, the present invention will be further described below in conjunction with preferred examples. A person skilled in the art should understand that the following detailed description is illustrative rather than limiting, and should not limit the scope of the invention.

In the present invention, the preparation methods are all conventional methods unless otherwise specified, and the raw materials used are all available from open commercial approaches unless otherwise specified, the percentages all refer to mass percentages, the temperature is in degree Celsius (° C.), a liquid crystal compound is also referred to as a liquid crystal monomer, and the specific meanings of other symbols and the test conditions are as follows:

Cp represents the clearing point (° C.) of a liquid crystal as measured by means of a DSC quantitative method;

$\Delta n$ represents optical anisotropy, with $\Delta n = n_e - n_o$, wherein $n_o$ is the refractive index of an ordinary light, and $n_e$ is the refractive index of an extraordinary light, with the test conditions being: 25±2° C., 589 nm and using an abbe refractometer for testing;

$\Delta \varepsilon$ represents dielectric anisotropy, with $\Delta \varepsilon = \varepsilon_\| - \varepsilon_\perp$, wherein $\varepsilon_\|$ is a dielectric constant parallel to a molecular axis, and $\varepsilon_\perp$ is a dielectric constant perpendicular to the molecular axis, with the test conditions being 25±0.5° C., a 20 micron parallel cell, and INSTEC: ALCT-IR1 for testing;

$\tau$ represents response time (ms), with the test instrument being DMS-501 and the test condition being 25±0.5° C.;

Cr represents contrast ratio, with the test condition being 25±0.5° C., the test equipment being DMS-501, and Cr=brightest transmittance/darkest transmittance; and $\theta$ represents pretilt angle, with the test condition being 25±0.5° C. and the test equipment being Otsuka RETS.

The method for preparing a liquid crystal display device involves: firstly, uniformly applying an alignment material to the surfaces of a first substrate and a second substrate, and heating and curing the uniformly applied alignment material at a heating temperature of 210-250° C., preferably 230° C. to form alignment layers, wherein the alignment material may be a polyimide; secondly, spreading spacers on the surface of the second substrate, applying a border adhesive along the edge of the first substrate, and curing the border adhesive at 120° C.; then, disposing the first substrate and the second substrate opposite to each other, and bonding them to form a structure having an interlayer space; and finally, injecting a liquid crystal composition and a polymerizable compound into the interlayer space between the first substrate and the second substrate, performing sealing and curing so that the liquid crystal composition and the polymerizable compound are sealed between the first substrate and the second substrate, and simultaneously applying electricity and ultraviolet light irradiation. The ultraviolet light irradiation is divided into two stages, including a first stage of ultraviolet light irradiation (UV1) and a second stage of ultraviolet light irradiation (UV2). Different pretilt angles are obtained by controlling the irradiation time and irradiance of the ultraviolet light and the applied voltage during the UV1 stage. In addition, the formation of a pretilt angle is related to the composition of the liquid crystal composition, especially the structure of the polymerizable compound. Under the conditions of being within a certain range, for example, 12-20 V, and the same irradiation energy, the smaller the applied voltage, the larger the formed pretilt angle. The irradiation energy is the product of the irradiation time and the irradiance. Under the condition of the same applied voltage, the greater the irradiation energy, the faster the rate of polymerization of the polymerizable compound, and the smaller the formed pretilt angle. However, since the rate of polymerization of the polymerizable compound has a great influence on the process of the liquid crystal display device, the rate of polymerization of the polymerizable compound cannot be too slow in order to obtain a larger pretilt angle.

The method for preparing a liquid crystal composition involves: weighing various liquid crystal monomers at a certain ratio and then placing these monomers in a stainless steel beaker, placing the stainless steel beaker containing these liquid crystal monomers on a magnetic stirring instrument for heating melting, after the liquid crystal monomers in the stainless steel beaker are mostly melted, adding a magnetic rotor to the stainless steel beaker, uniformly stirring the mixture, and cooling the mixture to room temperature to obtain a liquid crystal composition.

In the examples of the present invention, liquid crystal monomer structures are represented by codes, and the codes for ring structures, end groups and linking groups of liquid crystals are represented as in Tables 1 and 2 below.

TABLE 1

Corresponding code of ring structure

| Ring structure | Corresponding code |
|---|---|
|  | C |
|  | P |
| 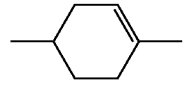 | L |
| 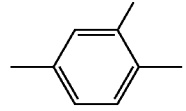 | G |
| 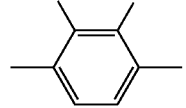 | Y |
| 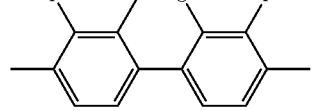 | Sa |
| 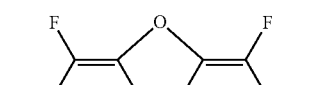 | Sb |
| 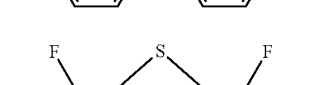 | Sc |

TABLE 2

Corresponding code of end group and linking group

| End group and linking group | Corresponding code |
|---|---|
| $C_nH_{2n+1}$— | n- |
| $C_nH_{2n+1}O$— | nO— |
| —$CH_2O$— | —O— |
| —F | —F |
| —$CH_2CH_2$— | —E— |
| —CH=CH— | —V— |
| —CH=CH—$C_nH_{2n+1}$ | —Vn |
| 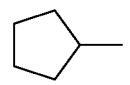 | Cp- |
| 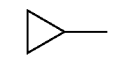 | Cpr- |
| 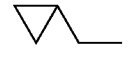 | Cpr1- |

EXAMPLES

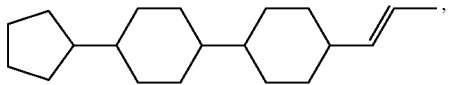

the code of which is CC-Cp-V1;

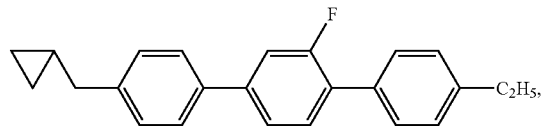 [SMILES: CCc1ccc(-c2ccc(-c3ccc(CC4CC4)cc3)cc2F)cc1]

the code of which is PGP-Cpr1-2;

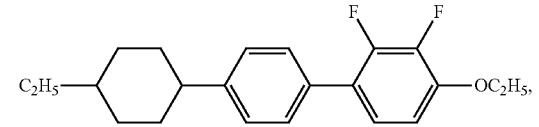 [SMILES: CCOc1ccc(-c2ccc(C3CCC(CC)CC3)cc2)c(F)c1F]

the code of which is CPY-2-O2;

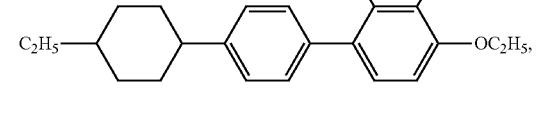

the code of which is CCY-3-O2;

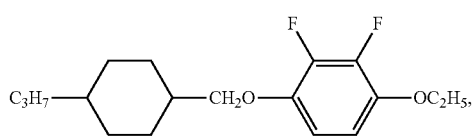

the code of which is COY-3-O2;

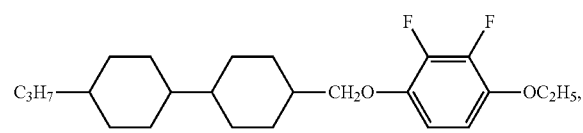

the code of which is CCOY-3-O2;

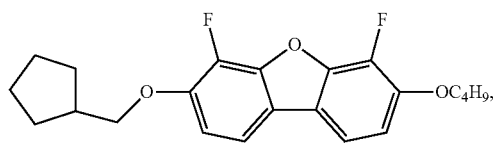

the code of which is Sb-Cp1O-O4; and

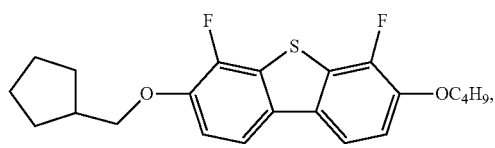

the code of which is Sc-Cp1O-O4.

Example 1

Preparation of a liquid crystal display device: firstly, a polyimide alignment material is uniformly applied to the surfaces of a first substrate and a second substrate, and is cured by means of heating at 230° C. to form an alignment layer with a thickness of 30 nm, wherein the first substrate is a color film substrate, the second substrate is a thin film transistor thin film substrate, a common electrode is provided on the first substrate, and a pixel electrode is provided on the second substrate. Secondly, spacers are spread on the surface of the second substrate, and a border adhesive is applied along the edge of the first substrate, and cured at 120° C. Then, the first substrate and the second substrate are disposed opposite to each other and bonded to form a structure having a 3.2 μm interlayer space. Finally, the liquid crystal composition and the polymerizable compound in Table 3 are sealed between the first substrate and the second substrate, and a square wave alternating electric field with a voltage of 15 V and a frequency of 60 Hz is applied to the liquid crystal display device while simultaneously performing a first stage of ultraviolet light irradiation (UV1) with a duration of 85 seconds (s), a wavelength of 365 nm, and an irradiance of 60 mW/cm², such that the polymerizable compound is polymerized to form a vertical alignment films and a pretilt angle of the liquid crystal molecules is formed. After the first stage of ultraviolet light irradiation (UV1) is completed, the second stage of ultraviolet light irradiation (UV2) is carried out, with also a wavelength of 365 nm, an irradiance of 5 mW/cm², and a duration of 100 minutes (min), to slowly polymerize the polymerizable compound which is not polymerized, so that no polymerizable compound residue is present in the liquid crystal composition; furthermore, the process of slowly polymerizing the polymerizable compound does not affect the pretilt angle that has been formed.

The liquid crystal composition of the liquid crystal display device, the polymerizable compound component, the content thereof and the corresponding properties thereof are as shown in Table 3 below.

TABLE 3

| Liquid crystal composition, polymerizable compound component, content and properties ||||
| --- | --- | --- |
| Category | Liquid crystal monomer code | Content (%) |
| I | CC-3-V | 10 |
| II | COY-3-O2 | 10 |
| II | COY-3-O1 | 10 |
| II | CCOY-2-O2 | 9 |
| II | CCY-3-O1 | 7 |
| II | CCY-3-O2 | 6 |
| II | CCY-4-O2 | 6 |
| II | CPY-5-O2 | 8 |
| II | CPY-3-O1Cpr | 10 |
| II | CPY-2-O2 | 10 |
| II | CY-3-O2 | 7 |
| II | CY-3-O4 | 7 |
| IV | IV1 | 0.5 |
| Δε [1 KHz, 20° C.]: −5.9 ε⊥ [1 KHz, 20° C.]: 10.6 Δn [589 nm, 20° C.]: 0.105 Cp: 86° C. Cr: 6100:1 θ: 89.3° τ: 8.1 ms ||||

Example 2

Preparation of a liquid crystal display device: firstly, a polyimide alignment material is uniformly applied to the surfaces of a first substrate and a second substrate, and is cured by means of heating at 230° C. to form an alignment layer with a thickness of 40 nm, wherein the first substrate is a color film substrate, the second substrate is a thin film transistor thin film substrate, a common electrode is provided on the first substrate, and a pixel electrode is provided on the second substrate. Secondly, spacers are spread on the surface of the second substrate, and a border adhesive is applied along the edge of the first substrate, and cured at 120° C. Then, the first substrate and the second substrate are disposed opposite to each other and bonded to form a structure having a 3.2 μm interlayer space. Finally, the liquid crystal composition and the polymerizable compound in Table 4 are sealed between the first substrate and the second substrate, and a square wave alternating electric field with a voltage of 12V and a frequency of 60 Hz is applied to the liquid crystal display device while simultaneously performing a first stage of ultraviolet light irradiation (UV1) with a duration of 85 seconds (s), a wavelength of 365 nm, and an irradiance of 60 mW/cm², such that the polymerizable compound is polymerized to form a vertical alignment films and a pretilt angle of the liquid crystal molecules is formed. After the first stage of ultraviolet light irradiation (UV1) is completed, the second stage of ultraviolet light irradiation (UV2) is carried out, with also a wavelength of 365 nm, an irradiance of 5 mW/cm², and a duration of 100 minutes (min), to slowly polymerize the polymerizable compound which is not polymerized, so that no polymerizable compound residue is present in the liquid crystal composition; furthermore, the process of slowly polymerizing the polymerizable compound does not affect the pretilt angle that has been formed.

The liquid crystal composition of the liquid crystal display device, the polymerizable compound component, the content thereof and the corresponding properties thereof are as shown in Table 4 below.

TABLE 4

Liquid crystal composition, polymerizable compound component, content and properties

| Category | Liquid crystal monomer code | Content (%) |
|---|---|---|
| I | CC-3-V | 14 |
| I | CC-5-V | 6 |
| II | COY-Cp-O2 | 10 |
| II | COY-3-O1 | 5 |
| II | CCOY-2-O2 | 4 |
| II | CCY-3-O2 | 7 |
| II | CCY-4-O2 | 7 |
| II | CPY-5-O2 | 5 |
| II | CPY-2-O2 | 5 |
| II | CY-3-O2 | 7 |
| III | PP-5-O2 | 10 |
| III | PP-5-1 | 10 |
| III | PP-1-2V | 10 |
| IV | IV2 | 0.3 |

Δε [1 KHz, 20° C.]: −3.5
$\varepsilon_\perp$ [1 KHz, 20° C.]: 7.3
Δn [589 nm, 20° C.]: 0.110
Cp: 75° C.
Cr: 6200:1
θ: 89.5°
τ: 8.4 ms

Example 3

Preparation of a liquid crystal display device: firstly, a polyimide alignment material is uniformly applied to the surfaces of a first substrate and a second substrate, and is cured by means of heating at 230° C. to form an alignment layer with a thickness of 60 nm, wherein the first substrate is a color film substrate, the second substrate is a thin film transistor thin film substrate, a common electrode is provided on the first substrate, and a pixel electrode is provided on the second substrate. Secondly, spacers are spread on the surface of the second substrate, and a border adhesive is applied along the edge of the first substrate, and cured at 120° C. Then, the first substrate and the second substrate are disposed opposite to each other and bonded to form a structure having a 3.2 μm interlayer space. Finally, the liquid crystal composition and the polymerizable compound in Table 5 are sealed between the first substrate and the second substrate, and a square wave alternating electric field with a voltage of 18V and a frequency of 60 Hz is applied to the liquid crystal display device while simultaneously performing a first stage of ultraviolet light irradiation (UV1) with a duration of 95 seconds (s), a wavelength of 365 nm, and an irradiance of 65 mW/cm², such that the polymerizable compound is polymerized to form a vertical alignment films and a pretilt angle of the liquid crystal molecules is formed. After the first stage of ultraviolet light irradiation (UV1) is completed, the second stage of ultraviolet light irradiation (UV2) is carried out, with also a wavelength of 365 nm, an irradiance of 5 mW/cm², and a duration of 100 minutes (min), to slowly polymerize the polymerizable compound which is not polymerized, so that no polymerizable compound residue is present in the liquid crystal composition; furthermore, the process of slowly polymerizing the polymerizable compound does not affect the pretilt angle that has been formed.

The liquid crystal composition of the liquid crystal display device, the polymerizable compound component, the content thereof and the corresponding properties thereof are as shown in Table 5 below.

TABLE 5

Liquid crystal composition, polymerizable compound component, content and properties

| Category | Liquid crystal monomer code | Content (%) |
|---|---|---|
| I | CC-3-V | 20 |
| I | CC-5-V | 10 |
| II | COY-Cp-O2 | 10 |
| II | CCOY-2-O2 | 4 |
| II | CCY-3-O2 | 7 |
| II | CCY-4-O2 | 7 |
| II | CPY-5-O2 | 5 |
| II | CPY-2-O2 | 5 |
| II | CY-3-O2 | 2 |
| V | CC-4-3 | 10 |
| V | CC-2-3 | 10 |
| V | CP-3-O2 | 10 |
| IV | IV3 | 0.1 |

Δε [1 KHz, 20° C.]: −2.8
$\varepsilon_\perp$ [1 KHz, 20° C.]: 5.7
Δn [589 nm, 20° C.]: 0.070
Cp: 75° C.
Cr: 6000:1
θ: 89.2°
τ: 7.8 ms

Example 4

Preparation of a liquid crystal display device: firstly, a polyimide alignment material is uniformly applied to the surfaces of a first substrate and a second substrate, and is cured by means of heating at 230° C. to form an alignment layer with a thickness of 80 nm, wherein the first substrate is a color film substrate, the second substrate is a thin film transistor thin film substrate, a common electrode is provided on the first substrate, and a pixel electrode is provided on the second substrate. Secondly, spacers are spread on the surface of the second substrate, and a border adhesive is applied along the edge of the first substrate, and cured at 120° C. Then, the first substrate and the second substrate are disposed opposite to each other and bonded to form a structure having a 3.2 μm interlayer space. Finally, the liquid crystal composition and the polymerizable compound in Table 6 are sealed between the first substrate and the second substrate, and a square wave alternating electric field with a voltage of 20V and a frequency of 60 Hz is applied to the liquid crystal display device while simultaneously performing a first stage of ultraviolet light irradiation (UV1) with a duration of 105 seconds (s), a wavelength of 365 nm, and an irradiance of 70 mW/cm², such that the polymerizable compound is polymerized to form a vertical alignment films and a pretilt angle of the liquid crystal molecules is formed. After the first stage of ultraviolet light irradiation (UV1) is completed, the second stage of ultraviolet light irradiation (UV2) is carried out, with also a wavelength of 365 nm, an irradiance of 5 mW/cm², and a duration of 100 minutes (min), to slowly polymerize the polymerizable compound which is not polymerized, so that no polymerizable compound residue is present in the liquid crystal composition; furthermore, the process of slowly polymerizing the polymerizable compound does not affect the pretilt angle that has been formed.

The liquid crystal composition of the liquid crystal display device, the polymerizable compound component, the content thereof and the corresponding properties thereof are as shown in Table 6 below.

TABLE 6

Liquid crystal composition, polymerizable compound component, content and properties

| Category | Liquid crystal monomer code | Content (%) |
| --- | --- | --- |
| I | CC-3-V | 30 |
| I | CC-5-V | 10 |
| II | COY-Cp-O2 | 10 |
| II | CCOY-2-O2 | 4 |
| II | CCY-3-O2 | 7 |
| II | CCY-4-O2 | 7 |
| II | CPY-5-O2 | 5 |
| II | CPY-2-O2 | 5 |
| II | CY-3-O2 | 2 |
| VI | Sb-2O-O5 | 10 |
| VI | Sc-2O-O4 | 10 |
| IV | IV4 | 0.05 |

$\Delta\varepsilon$ [1 KHz, 20° C.]: −5.1
$\varepsilon_\perp$ [1 KHz, 20° C.]: 9.3
$\Delta n$ [589 nm, 20° C.]: 0.100
Cp: 71° C.
Cr: 5900:1
$\theta$: 89.1°
$\tau$: 8.0 ms Example 5

Preparation of a liquid crystal display device: firstly, a polyimide alignment material is uniformly applied to the surfaces of a first substrate and a second substrate, and is cured by means of heating at 230° C. to form an alignment layer with a thickness of 60 nm, wherein the first substrate is a color film substrate, the second substrate is a thin film transistor thin film substrate, a common electrode is provided on the first substrate, and a pixel electrode is provided on the second substrate. Secondly, spacers are spread on the surface of the second substrate, and a border adhesive is applied along the edge of the first substrate, and cured at 120° C. Then, the first substrate and the second substrate are disposed opposite to each other and bonded to form a structure having a 3.2 μm interlayer space. Finally, the liquid crystal composition and the polymerizable compound in Table 7 are sealed between the first substrate and the second substrate, and a square wave alternating electric field with a voltage of 15V and a frequency of 60 Hz is applied to the liquid crystal display device while simultaneously performing a first stage of ultraviolet light irradiation (UV1) with a duration of 95 seconds (s), a wavelength of 365 nm, and an irradiance of 65 mW/cm², such that the polymerizable compound is polymerized to form a vertical alignment films and a pretilt angle of the liquid crystal molecules is formed. After the first stage of ultraviolet light irradiation (UV1) is completed, the second stage of ultraviolet light irradiation (UV2) is carried out, with also a wavelength of 365 nm, an irradiance of 5 mW/cm², and a duration of 100 minutes (min), to slowly polymerize the polymerizable compound which is not polymerized, so that no polymerizable compound residue is present in the liquid crystal composition; furthermore, the process of slowly polymerizing the polymerizable compound does not affect the pretilt angle that has been formed.

The liquid crystal composition of the liquid crystal display device, the polymerizable compound component, the content thereof and the corresponding properties thereof are as shown in Table 7 below.

TABLE 7

Liquid crystal composition, polymerizable compound component, content and properties

| Category | Liquid crystal monomer code | Content (%) |
| --- | --- | --- |
| I | CC-3-V | 21 |
| I | CC-4-V | 6.5 |
| II | CY-3-O2 | 5.5 |
| II | COY-3-O2 | 7 |
| II | COY-3-O1 | 6 |
| II | CCOY-2-O2 | 8 |
| II | CPY-5-O2 | 8 |
| II | CPY-3-O2 | 8 |
| II | CPY-2-O2 | 10 |
| VII | CPP-3-2 | 10 |
| VII | CPP-5-2 | 10 |
| IV | IV5 | 0.03 |

$\Delta\varepsilon$ [1 KHz, 20° C.]: −4.8
$\varepsilon_\perp$ [1 KHz, 20° C.]: 7.5
$\Delta n$ [589 nm, 20° C.]: 0.109
Cp: 74° C.
Cr: 6000:1
$\theta$: 89.2°
$\tau$: 7.9 ms Example 6

Preparation of a liquid crystal display device: firstly, a polyimide alignment material is uniformly applied to the surfaces of a first substrate and a second substrate, and is cured by means of heating at 230° C. to form an alignment layer with a thickness of 120 nm, wherein the first substrate is a color film substrate, the second substrate is a thin film transistor thin film substrate, a common electrode is provided on the first substrate, and a pixel electrode is provided on the second substrate. Secondly, spacers are spread on the surface of the second substrate, and a border adhesive is applied along the edge of the first substrate, and cured at 120° C. Then, the first substrate and the second substrate are disposed opposite to each other and bonded to form a structure having a 3.2 μm interlayer space. Finally, the liquid crystal composition and the polymerizable compound in Table 8 are sealed between the first substrate and the second substrate, and a square wave alternating electric field with a voltage of 20V and a frequency of 60 Hz is applied to the liquid crystal display device while simultaneously performing a first stage of ultraviolet light irradiation (UV1) with a duration of 115 seconds (s), a wavelength of 365 nm, and an irradiance of 72 mW/cm², such that the polymerizable compound is polymerized to form a vertical alignment films and a pretilt angle of the liquid crystal molecules is formed. After the first stage of ultraviolet light irradiation (UV1) is completed, the second stage of ultraviolet light irradiation (UV2) is carried out, with also a wavelength of 365 nm, an irradiance of 5 mW/cm², and a duration of 100 minutes (min), to slowly polymerize the polymerizable compound which is not polymerized, so that no polymerizable compound residue is present in the liquid crystal composition;

furthermore, the process of slowly polymerizing the polymerizable compound does not affect the pretilt angle that has been formed.

The liquid crystal composition of the liquid crystal display device, the polymerizable compound component, the content thereof and the corresponding properties thereof are as shown in Table 8 below.

TABLE 8

Liquid crystal composition, polymerizable compound component, content and properties

| Category | Liquid crystal monomer code | Content (%) |
| --- | --- | --- |
| I | CC-3-V | 21 |
| I | CC-4-V | 6.5 |
| II | PY-3-O2 | 2.5 |
| II | COY-3-O2 | 8 |
| II | COY-3-O1 | 7 |
| II | CCOY-2-O2 | 9 |
| II | CPY-5-O2 | 3 |
| II | CPY-3-O2 | 10 |
| II | CPY-2-O2 | 10 |
| II | CCY-3-O2 | 4 |
| II | CCY-5-O2 | 4 |
| II | CY-3-O4 | 5 |
| II | CY-3-O2 | 5 |
| VIII | CPPC-3-3 | 3 |
| VIII | CGPC-3-3 | 2 |
| IV | IV6 | 0.01 |

$\Delta\varepsilon$ [1 KHz, 20° C.]: −5.7
$\varepsilon_\perp$ [1 KHz, 20° C.]: 9.5
$\Delta n$ [589 nm, 20° C.]: 0.101
Cp: 89° C.
Cr: 5000:1
$\theta$: 88.5°
$\tau$: 7.6 ms

Example 7

The same liquid crystal display device preparation process as in Example 1 is employed, except that the liquid crystal composition and the polymerizable compound in Table 9 are sealed between the first substrate and the second substrate, to obtain a liquid crystal display device of Example 7.

The liquid crystal composition of the liquid crystal display device, the polymerizable compound component, the content thereof and the corresponding properties thereof are as shown in Table 9 below.

TABLE 9

Liquid crystal composition, polymerizable compound component, content and properties

| Category | Liquid crystal monomer code | Content (%) |
| --- | --- | --- |
| I | CC-3-V | 14 |
| I | CC-5-V | 6 |
| II | COY-Cp-O2 | 10 |
| II | COY-3-O1 | 5 |
| II | CCOY-2-O2 | 4 |
| II | CCY-3-O2 | 7 |
| II | CCY-4-O2 | 7 |
| II | CPY-5-O2 | 5 |
| II | CPY-2-O2 | 5 |
| II | CY-3-O2 | 7 |
| III | PP-5-O2 | 10 |
| V | CC-4-3 | 10 |
| V | CP-3-O2 | 10 |
| IV | IV7 | 0.3 |

TABLE 9-continued

Liquid crystal composition, polymerizable compound component, content and properties $\Delta\varepsilon$ [1 KHz, 20° C.]: −3.4
$\varepsilon_\perp$ [1 KHz, 20° C.]: 7.2
$\Delta n$ [589 nm, 20° C.]: 0.092
Cp: 70° C.
Cr: 6050:1
$\theta$: 89.3°
$\tau$: 8.2 ms

Example 8

The same liquid crystal display device preparation process as in Example 1 is employed, except that the liquid crystal composition and the polymerizable compound in Table 10 are sealed between the first substrate and the second substrate, to obtain a liquid crystal display device of Example 8.

The liquid crystal composition of the liquid crystal display device, the polymerizable compound component, the content thereof and the corresponding properties thereof are as shown in Table 10 below.

TABLE 10

Liquid crystal composition, polymerizable compound component, content and properties

| Category | Liquid crystal monomer code | Content (%) |
| --- | --- | --- |
| I | CC-3-V | 14 |
| I | CC-5-V | 11 |
| II | COY-Cp-O2 | 10 |
| II | COY-3-O1 | 5 |
| II | CCOY-2-O2 | 4 |
| II | CCY-3-O2 | 7 |
| II | CCY-4-O2 | 7 |
| II | CPY-5-O2 | 5 |
| II | CPY-2-O2 | 5 |
| II | CY-3-O2 | 7 |
| III | PP-5-O2 | 8 |
| III | PP-5-1 | 7 |
| VI | Sb-2O-O5 | 10 |
| IV | IV8 | 0.4 |

$\Delta\varepsilon$ [1 KHz, 20° C.]: −4.7
$\varepsilon_\perp$ [1 KHz, 20° C.]: 9.1
$\Delta n$ [589 nm, 20° C.]: 0.106
Cp: 65° C.
Cr: 6100:1
$\theta$: 89.4°
$\tau$: 8.9 ms

Example 9

The same liquid crystal display device preparation process as in Example 3 is employed, except that the liquid crystal composition and the polymerizable compound in Table 11 are sealed between the first substrate and the second substrate, to obtain a liquid crystal display device of Example 9.

The liquid crystal composition of the liquid crystal display device, the polymerizable compound component, the content thereof and the corresponding properties thereof are as shown in Table 11 below.

TABLE 11

Liquid crystal composition, polymerizable compound component, content and properties

| Category | Liquid crystal monomer code | Content (%) |
|---|---|---|
| I | CC-3-V | 30 |
| I | CC-5-V | 10 |
| II | COY-Cp-O2 | 10 |
| II | CCOY-2-O2 | 4 |
| II | CCY-3-O2 | 7 |
| II | CCY-4-O2 | 7 |
| II | CPY-5-O2 | 10 |
| II | CPY-2-O2 | 5 |
| II | CY-3-O2 | 2 |
| V | CC-4-3 | 10 |
| VI | Sb-Cp1O-O5 | 3 |
| VI | Sc-2O-O4 | 2 |
| IV | IV3 | 0.2 |

$\Delta\varepsilon$ [1 KHz, 20° C.]: −3.5
$\varepsilon_\perp$ [1 KHz, 20° C.]: 6.9
$\Delta n$ [589 nm, 20° C.]: 0.085
Cp: 80° C.
Cr: 6000:1
θ: 89.2°
τ: 8.9 ms

Example 10

The same liquid crystal display device preparation process as in Example 5 is employed, except that the liquid crystal composition and the polymerizable compound in Table 12 are sealed between the first substrate and the second substrate, to obtain a liquid crystal display device of Example 10.

The liquid crystal composition of the liquid crystal display device, the polymerizable compound component, the content thereof and the corresponding properties thereof are as shown in Table 12 below.

TABLE 12

Liquid crystal composition, polymerizable compound component, content and properties

| Category | Liquid crystal monomer code | Content (%) |
|---|---|---|
| I | CC-3-V | 21 |
| I | CC-4-V | 6.5 |
| II | CY-3-O2 | 5.5 |
| II | COY-3-O2 | 7 |
| II | COY-3-O1 | 6 |
| II | CCOY-2-O2 | 8 |
| II | CPY-5-O2 | 8 |
| II | CPY-3-O2 | 8 |
| II | CPY-2-O2 | 10 |
| III | PP-5-O2 | 8 |
| VII | CPP-3-2 | 5 |
| VII | CPP-5-2 | 5 |
| VII | PGP-Cpr1-1 | 2 |
| IV | IV3 | 0.03 |

$\Delta\varepsilon$ [1 KHz, 20° C.]: −4.9
$\varepsilon_\perp$ [1 KHz, 20° C.]: 7.8
$\Delta n$ [589 nm, 20° C.]: 0.113
Cp: 79° C.
Cr: 6000:1
θ: 89.2°
τ: 8.8 ms

Example 11

The same liquid crystal display device preparation process as in Example 5 is employed, except that the liquid crystal composition and the polymerizable compound in Table 13 are sealed between the first substrate and the second substrate, to obtain a liquid crystal display device of Example 11.

The liquid crystal composition of the liquid crystal display device, the polymerizable compound component, the content thereof and the corresponding properties thereof are as shown in Table 13 below.

TABLE 13

Liquid crystal composition, polymerizable compound component, content and properties

| Category | Liquid crystal monomer code | Content (%) |
|---|---|---|
| I | CC-3-V | 21 |
| I | CC-4-V | 6.5 |
| II | CY-3-O2 | 5.5 |
| II | COY-3-O2 | 7 |
| II | COY-3-O1 | 6 |
| II | CCOY-2-O2 | 8 |
| II | CPY-5-O2 | 8 |
| II | CPY-3-O2 | 8 |
| II | CPY-2-O2 | 10 |
| V | CC-2-3 | 5 |
| VII | CPP-3-2 | 8 |
| VII | CPP-5-2 | 7 |
| IV | IV6 | 0.05 |

$\Delta\varepsilon$ [1 KHz, 20° C.]: −4.5
$\varepsilon_\perp$ [1 KHz, 20° C.]: 7.2
$\Delta n$ [589 nm, 20° C.]: 0.103
Cp: 70° C.
Cr: 6000:1
θ: 89.2°
τ: 7.6 ms

Example 12

The same liquid crystal display device preparation process as in Example 5 is employed, except that the liquid crystal composition and the polymerizable compound in Table 14 are sealed between the first substrate and the second substrate, to obtain a liquid crystal display device of Example 12.

The liquid crystal composition of the liquid crystal display device, the polymerizable compound component, the content thereof and the corresponding properties thereof are as shown in Table 14 below.

TABLE 14

Liquid crystal composition, polymerizable compound component, content and properties

| Category | Liquid crystal monomer code | Content (%) |
|---|---|---|
| I | CC-3-V | 21 |
| I | CC-4-V | 6.5 |
| II | CY-3-O2 | 5.5 |
| II | COY-3-O2 | 7 |
| II | COY-3-O1 | 6 |
| II | CCOY-2-O2 | 8 |
| II | CPY-5-O2 | 8 |
| II | CPY-3-O2 | 8 |
| II | CPY-2-O2 | 10 |
| VI | Sb-2O-O5 | 5 |
| VII | CPP-3-2 | 8 |
| VII | CPP-5-2 | 7 |
| IV | IV1 | 0.03 |

$\Delta\varepsilon$ [1 KHz, 20° C.]: −5.6
$\varepsilon_\perp$ [1 KHz, 20° C.]: 9.2

Example 13

The same liquid crystal display device preparation process as in Example 5 is employed, except that the liquid crystal composition and the polymerizable compound in Table 15 are sealed between the first substrate and the second substrate, to obtain a liquid crystal display device of Example 13.

The liquid crystal composition of the liquid crystal display device, the polymerizable compound component, the content thereof and the corresponding properties thereof are as shown in Table 15 below.

TABLE 15

Liquid crystal composition, polymerizable compound component, content and properties

| Category | Liquid crystal monomer code | Content (%) |
|---|---|---|
| I | CC-3-V | 20 |
| I | CC-4-V | 10 |
| I | CC-5-V | 10 |
| II | CY-3-O2 | 11 |
| II | COY-3-O2 | 14 |
| II | COY-3-O1 | 4 |
| II | CCOY-2-O2 | 5 |
| II | CPY-5-O2 | 3 |
| II | CPY-3-O2 | 8 |
| VII | CCP-3-1 | 5 |
| VII | CPP-3-2V1 | 4 |
| VII | CPP-1V-2 | 4 |
| VIII | CGPC-3-3 | 2 |
| IV | IV6 | 0.8 |

$\Delta\varepsilon$ [1 KHz, 20° C.]: −3.1
$\varepsilon_\perp$ [1 KHz, 20° C.]: 6.1
$\Delta n$ [589 nm, 20° C.]: 0.094
Cp: 67° C.
Cr: 6050:1
θ: 89.2°
τ: 8.0 ms

Example 14

The same liquid crystal display device preparation process as in Example 5 is employed, except that the liquid crystal composition and the polymerizable compound in Table 16 are sealed between the first substrate and the second substrate, to obtain a liquid crystal display device of Example 14.

The liquid crystal composition of the liquid crystal display device, the polymerizable compound component, the content thereof and the corresponding properties thereof are as shown in Table 16 below.

TABLE 16

Liquid crystal composition, polymerizable compound component, content and properties

| Category | Liquid crystal monomer code | Content (%) |
|---|---|---|
| I | CC-3-V | 11 |
| I | CC-4-V | 6.5 |
| II | CY-3-O2 | 5.5 |
| II | COY-3-O2 | 7 |
| II | COY-3-O1 | 6 |
| II | CCOY-2-O2 | 8 |
| II | CPY-5-O2 | 8 |
| II | CPY-3-O2 | 8 |
| II | CPY-2-O2 | 10 |
| III | PP-5-O2 | 8 |
| V | CC-2-3 | 10 |
| VII | CPP-3-2 | 5 |
| VII | CPP-5-2 | 5 |
| VII | PGP-Cpr1-1 | 2 |
| IV | IV3 | 0.06 |

$\Delta\varepsilon$ [1 KHz, 20° C.]: −4.8
$\varepsilon_\perp$ [1 KHz, 20° C.]: 7.7
$\Delta n$ [589 nm, 20° C.]: 0.115
Cp: 81° C.
Cr: 6000:1
θ: 89.2°
τ: 9.0 ms

Example 15

The same liquid crystal display device preparation process as in Example 5 is employed, except that the liquid crystal composition and the polymerizable compound in Table 17 are sealed between the first substrate and the second substrate, to obtain a liquid crystal display device of Example 15.

The liquid crystal composition of the liquid crystal display device, the polymerizable compound component, the content thereof and the corresponding properties thereof are as shown in Table 17 below.

TABLE 17

Liquid crystal composition, polymerizable compound component, content and properties

| Category | Liquid crystal monomer code | Content (%) |
|---|---|---|
| I | CC-3-V | 11 |
| I | CC-4-V | 6.5 |
| II | CY-3-O2 | 5.5 |
| II | COY-3-O2 | 7 |
| II | COY-3-O1 | 6 |
| II | CCOY-2-O2 | 8 |
| II | CPY-5-O2 | 8 |
| II | CPY-3-O2 | 8 |
| II | CPY-2-O2 | 10 |
| III | PP-5-O2 | 8 |
| VI | Sb-2O-O5 | 5 |
| VI | Sb-Cpr1O-O5 | 3 |
| VI | Sc-Cp1O-O4 | 2 |
| VII | CPP-3-2 | 5 |
| VII | CPP-5-2 | 5 |
| VII | PGP-Cpr1-1 | 2 |
| IV | IV3 | 0.06 |

$\Delta\varepsilon$ [1 KHz, 20° C.]: −6.3
$\varepsilon_\perp$ [1 KHz, 20° C.]: 10.4
$\Delta n$ [589 nm, 20° C.]: 0.120
Cp: 86° C.
Cr: 6000:1
θ: 89.2°
τ: 9.5 ms

---

TABLE 14-continued

Liquid crystal composition, polymerizable compound component, content and properties $\Delta n$ [589 nm, 20° C.]: 0.105
Cp: 76° C.
Cr: 6100:1
θ: 89.3°
τ: 8.4 ms

Example 16

The same liquid crystal display device preparation process as in Example 4 is employed, except that the liquid crystal composition and the polymerizable compound in Table 18 are sealed between the first substrate and the second substrate, to obtain a liquid crystal display device of Example 16.

The liquid crystal composition of the liquid crystal display device, the polymerizable compound component, the content thereof and the corresponding properties thereof are as shown in Table 18 below.

TABLE 18

Liquid crystal composition, polymerizable compound component, content and properties

| Category | Liquid crystal monomer code | Content (%) |
| --- | --- | --- |
| I | CC-3-V | 16 |
| I | CC-4-V | 6.5 |
| II | CY-3-O2 | 5.5 |
| II | COY-3-O2 | 12 |
| II | COY-3-O1 | 6 |
| II | CCOY-2-O2 | 8 |
| II | CPY-5-O2 | 8 |
| II | CPY-3-O2 | 8 |
| II | CPY-2-O2 | 10 |
| III | PP-5-O2 | 8 |
| VII | CPP-3-2 | 5 |
| VII | CPP-5-2 | 5 |
| VIII | CPPC-3-3 | 2 |
| IV | IV3 | 0.07 |

Δε [1 KHz, 20° C.]: −5.1
ε⊥ [1 KHz, 20° C.]: 7.9
Δn [589 nm, 20° C.]: 0.125
Cp: 87° C.
Cr: 5800:1
θ: 89.0°
τ: 9.6 ms

Example 17

The same liquid crystal display device preparation process as in Example 5 is employed, except that the liquid crystal composition and the polymerizable compound in Table 19 are sealed between the first substrate and the second substrate, to obtain a liquid crystal display device of Example 17.

The liquid crystal composition of the liquid crystal display device, the polymerizable compound component, the content thereof and the corresponding properties thereof are as shown in Table 19 below.

TABLE 19

Liquid crystal composition, polymerizable compound component, content and properties

| Category | Liquid crystal monomer code | Content (%) |
| --- | --- | --- |
| I | CC-3-V | 11 |
| I | CC-4-V | 6.5 |
| II | CY-3-O2 | 5.5 |
| II | COY-3-O2 | 7 |
| II | COY-3-O1 | 6 |
| II | CCOY-2-O2 | 8 |
| II | CPY-5-O2 | 8 |
| II | CPY-3-O2 | 8 |
| II | CPY-2-O2 | 10 |
| III | PP-5-O2 | 8 |
| V | CC-2-3 | 5 |
| VI | Sb-2O-O5 | 5 |
| VII | CPP-3-2 | 5 |
| VII | CPP-5-2 | 5 |
| VII | PGP-2-3 | 2 |
| IV | IV1 | 0.3 |

Δε [1 KHz, 20° C.]: −5.1
ε⊥ [1 KHz, 20° C.]: 8.4
Δn [589 nm, 20° C.]: 0.116
Cp: 81° C.
Cr: 6000:1
θ: 89.2°
τ: 9.2 ms

Example 18

The same liquid crystal display device preparation process as in Example 5 is employed, except that the liquid crystal composition and the polymerizable compound in Table 20 are sealed between the first substrate and the second substrate, to obtain a liquid crystal display device of Example 18.

The liquid crystal composition of the liquid crystal display device, the polymerizable compound component, the content thereof and the corresponding properties thereof are as shown in Table 20 below.

TABLE 20

Liquid crystal composition, polymerizable compound component, content and properties

| Category | Liquid crystal monomer code | Content (%) |
| --- | --- | --- |
| I | CC-3-V | 11 |
| I | CC-4-V | 6.5 |
| II | CY-3-O2 | 5.5 |
| II | COY-3-O2 | 7 |
| II | COY-3-O1 | 6 |
| II | CCOY-2-O2 | 8 |
| II | CPY-5-O2 | 8 |
| II | CPY-3-O2 | 8 |
| II | CPY-2-O2 | 10 |
| III | PP-5-O2 | 8 |
| V | CC-2-3 | 10 |
| VII | CPP-3-2 | 5 |
| VII | CPP-5-2 | 5 |
| VIII | CPPC-3-3 | 2 |
| IV | IV6 | 0.5 |

Δε [1 KHz, 20° C.]: −4.9
ε⊥ [1 KHz, 20° C.]: 7.9
Δn [589 nm, 20° C.]: 0.116
Cp: 82° C.
Cr: 6000:1
θ: 89.2°
τ: 9.1 ms

Example 19

The same liquid crystal display device preparation process as in Example 5 is employed, except that the liquid crystal composition and the polymerizable compound in Table 21 are sealed between the first substrate and the second substrate, to obtain a liquid crystal display device of Example 19.

The liquid crystal composition of the liquid crystal display device, the polymerizable compound component, the content thereof and the corresponding properties thereof are as shown in Table 21 below.

TABLE 21

Liquid crystal composition, polymerizable compound component, content and properties

| Category | Liquid crystal monomer code | Content (%) |
| --- | --- | --- |
| I | CC-3-V | 11 |
| I | CC-4-V | 6.5 |
| II | CY-3-O2 | 5.5 |
| II | COY-3-O2 | 7 |
| II | COY-3-O1 | 6 |
| II | CCOY-2-O2 | 8 |
| II | CPY-5-O2 | 8 |
| II | CPY-3-O2 | 8 |
| II | CPY-2-O2 | 10 |
| III | PP-5-O2 | 8 |
| V | CC-2-3 | 5 |
| VI | Sb-2O-O5 | 5 |
| VII | CPP-3-2 | 5 |
| VII | CPP-5-2 | 5 |
| VIII | CPPC-3-3 | 2 |
| IV | IV3 | 0.03 |

Δε [1 KHz, 20° C.]: −5.1
ε⊥ [1 KHz, 20° C.]: 8.4
Δn [589 nm, 20° C.]: 0.116
Cp: 82° C.
Cr: 6000:1
θ: 89.2°
τ: 9.5 ms

Comparative Example 1

Preparation of a liquid crystal display device: firstly, a polyimide alignment material is uniformly applied to the surfaces of a first substrate and a second substrate, and is cured by means of heating at 230° C. to form an alignment layer with a thickness of 60 nm, wherein the first substrate is a color film substrate, the second substrate is a thin film transistor thin film substrate, a common electrode is provided on the first substrate, and a pixel electrode is provided on the second substrate. Secondly, spacers are spread on the surface of the second substrate, and a border adhesive is applied along the edge of the first substrate, and cured at 120° C. Then, the first substrate and the second substrate are disposed opposite to each other and bonded to form a structure having a 3.2 μm interlayer space. Finally, the liquid crystal composition and the polymerizable compound in Table 16 are sealed between the first substrate and the second substrate, and a square wave alternating electric field with a voltage of 10V and a frequency of 60 Hz is applied to the liquid crystal display device while simultaneously performing a first stage of ultraviolet light irradiation (UV1) with a duration of 120 seconds (s), a wavelength of 365 nm, and an irradiance of 75 mW/cm², such that the polymerizable compound is polymerized to form a vertical alignment films and a pretilt angle of the liquid crystal molecules is formed. After the first stage of ultraviolet light irradiation (UV1) is completed, the second stage of ultraviolet light irradiation (UV2) is carried out, with also a wavelength of 365 nm, an irradiance of 5 mW/cm², and a duration of 100 minutes (min), to slowly polymerize the polymerizable compound which is not polymerized, so that no polymerizable compound residue is present in the liquid crystal composition; furthermore, the process of slowly polymerizing the polymerizable compound does not affect the pretilt angle that has been formed.

The corresponding properties of the liquid crystal display device of Comparative Example 1 are as follows.

Δε [1 KHz, 20° C.]: −4.8
ε⊥ [1 KHz, 20° C.]: 7.7
Δn [589 nm, 20° C.]: 0.115
Cp: 81° C.
Cr: 4800:1
θ: 88.2°
τ: 7.9 ms

Comparing Comparative Example 1 with Example 14, the compositions of the liquid crystal composition and the polymerizable compound component and the contents thereof are the same; under different preparation conditions, the pretilt angle of the liquid crystal display device varies greatly, thereby causing the contrast ratio (Cr) of the liquid crystal display device of Comparative Example 1 to be significantly lower than that of the liquid crystal display device of Example 14.

Comparative Example 2

By using the same liquid crystal display device preparation process as in Example 14 and only replacing the compounds represented by formula I in the liquid crystal composition in Table 16 by a compound represented by formula IX, a liquid crystal display device of Comparative Example 2 is obtained.

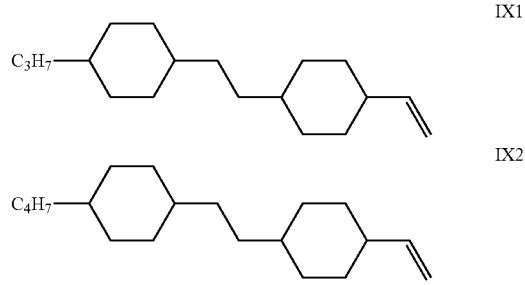

The liquid crystal composition of the liquid crystal display device, the polymerizable compound component, the content thereof and the corresponding properties thereof are as shown in Table 22 below.

TABLE 22

Liquid crystal composition, polymerizable compound component, content and properties

| Category | Liquid crystal monomer code | Content (%) |
| --- | --- | --- |
| IX | CEC-3-V | 11 |
| IX | CEC-4-V | 6.5 |
| II | CY-3-O2 | 5.5 |
| II | COY-3-O2 | 7 |
| II | COY-3-O1 | 6 |
| II | CCOY-2-O2 | 8 |
| II | CPY-5-O2 | 8 |
| II | CPY-3-O2 | 8 |
| II | CPY-2-O2 | 10 |
| III | PP-5-O2 | 8 |
| V | CC-2-3 | 10 |

TABLE 22-continued

| | Liquid crystal composition, polymerizable compound component, content and properties | |
|---|---|---|
| VII | CPP-3-2 | 5 |
| VII | CPP-5-2 | 5 |
| VII | PGP-Cpr1-1 | 2 |
| IV | IV3 | 0.06 |
| | Δε [1 KHz, 20° C.]: −4.7 ε⊥ [1 KHz, 20° C.]: 7.6 Δn [589 nm, 20° C.]: 0.114 Cp: 82° C. Cr: 4900:1 θ: 88.4° τ: 8.2 ms | |

Comparing Comparative Example 2 with Example 14, although the same liquid crystal device preparation process is employed, a difference in the pretilt angle of the liquid crystal display device is caused by the difference in the composition of the liquid crystal composition, thereby affecting the contrast ratio of the liquid crystal display device of Comparative Example 2, which is significantly lower than that of the liquid crystal display device of Example 14.

The invention claimed is:

1. A liquid crystal display device, comprising a first substrate, a second substrate, and a liquid crystal composition disposed between said first substrate and said second substrate, wherein said first substrate and said second substrate are disposed in parallel and opposite to each other;

alignment layers are disposed on sides of said first and second substrates that are close to said liquid crystal composition;

said alignment layers are provided with vertical alignment films that allow liquid crystal molecules in said liquid crystal composition to be arranged roughly perpendicular to said first and second substrates, with said liquid crystal molecules having a pretilt angle of 88.5° to 89.5°; and said liquid crystal composition comprises one or more compounds represented by formula I, a compound represented by formula VI4, a compound represented by formula VI5, a compound represented by formula VI8, one or more compounds represented by formulas II1, II5 to II6, and three different compounds represented by formula II4 below:

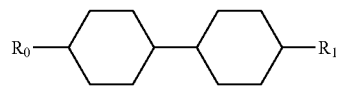
I wherein $R_0$ represents an alkyl group having a carbon atom number of 1-10, and $R_1$ represents an alkenyl group having a carbon atom number of 2-10; and

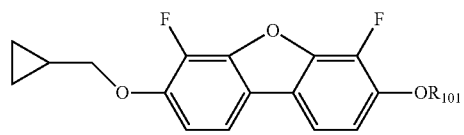
V14

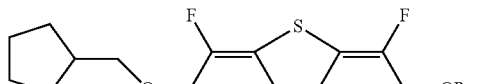
V15

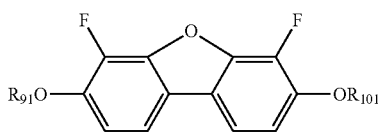
V18 wherein $R_{91}$ represents an alkyl group having a carbon atom number of 2, $R_{101}$ represents an alkyl group having a carbon atom number of 4-5;

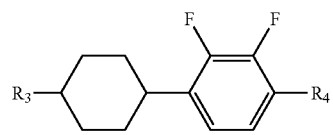
II1

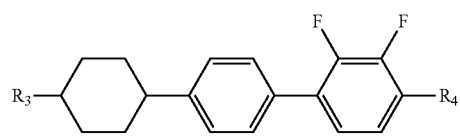
II4

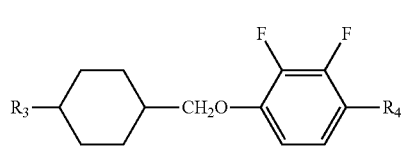
II5

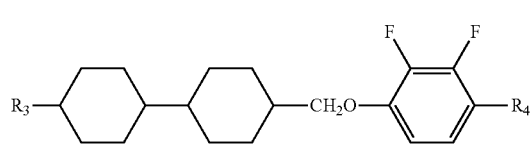
II6 wherein $R_3$ represents an alkyl group having a carbon atom number of 2-5 and $R_4$ represents an alkoxy group having a carbon atom number of 1-10, a fluorine-substituted alkoxy group having a carbon atom number of 1-2, in said liquid crystal composition, the total mass content of the compounds represented by formulas II1, II5 to II6 is 26.5%, the total mass content of the compounds represented by formula II4 is 26%, the total mass content of the compounds represented by formulas VI4, VI5, VI8 is 10%.

2. The liquid crystal display device according to claim 1, wherein said first substrate is a color film substrate, and said second substrate is a thin film transistor substrate; and said first substrate is provided with a common electrode, and said second substrate is provided with a pixel electrode.

3. The liquid crystal display device according to claim 1, wherein said alignment layers have a thickness of 30 nm to 120 nm.

4. The liquid crystal display device according to claim 1, wherein said pretilt angle is 89.1° to 89.5°.

5. The liquid crystal display device according to claim 1, wherein said vertical alignment films are thin films formed by polymerizing a polymerizable compound having a polymerizable group.

6. The liquid crystal display device according to claim 5, wherein said polymerizable compound is selected from one or more compounds represented by formula IV:

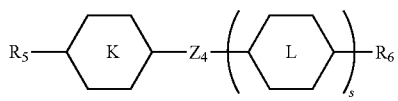

wherein $R_5$ and $R_6$ each independently represent $P_3$—$Sp_3$-, H, Cl, F, or an alkyl having a carbon atom number of 1-12; one or more non-neighboring —$CH_2$— groups in said alkyl having a carbon atom number of 1-12 is optionally replaced by —O—, —$CH_2$=$CH_2$—, —CO—, —OCO— or —COO—; wherein at least one of $R_5$ and $R_6$ represents $P_3$—$Sp_3$-;

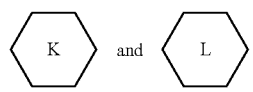

each independently represent phenylene, a phenylene group optionally substituted with $P_3$—$Sp_3$-, Cl, F, an alkyl having a carbon atom number of 1-12 or an alkoxy group having a carbon atom number of 1-12, or indanyl, wherein one or two non-neighboring —$CH_2$— groups in said alkyl having a carbon atom number of 1-12 and said alkoxy group having a carbon atom number of 1-12 are optionally replaced by —O—, —$CH_2$=$CH_2$—, —CO—, —OCO— or —COO—; furthermore,

is bonded to $R_5$ at any position of

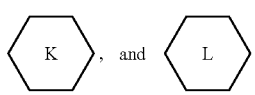

is bonded to $R_6$ at any position of

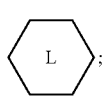

s represents 0, 1;
$P_3$ represents a polymerizable group; $Sp_3$ represents a spacer group; and
$Z_4$ represents a single bond, —COO—, —$CH_2$O— or —$CH_2CH_2$—.

7. The liquid crystal display device according to claim 1, wherein said liquid crystal composition further comprises one or more compounds represented by formula III:

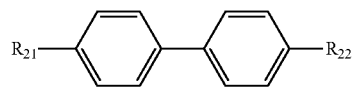

wherein $R_{21}$ and $R_{22}$ each independently represent an alkyl group having a carbon atom number of 1-10, an alkoxy group having a carbon atom number of 1-10, an alkenyl group having a carbon atom number of 2-10, or an alkenoxy group having a carbon atom number of 3-8.

8. The liquid crystal display device according to claim 1, wherein said liquid crystal composition further comprises one or more compounds represented by formula V:

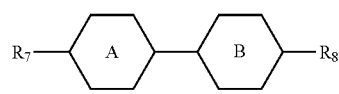

wherein $R_7$ and $R_8$ each independently represent an alkyl group having a carbon atom number of 1-10, an alkoxy group having a carbon atom number of 1-10, an alkenyl group having a carbon atom number of 2-10, or an alkenoxy group having a carbon atom number of 3-8;

represents

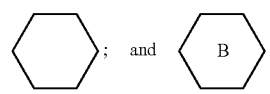

represents

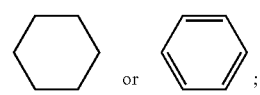 [SMILES: C1CCCCC1 ; c1ccccc1]

where is

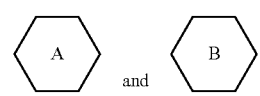

both represent

then $R_8$ does not represent an alkenyl group.

9. The liquid crystal display device according to claim 1, wherein said liquid crystal composition further comprises one or more compounds represented by formula VII:

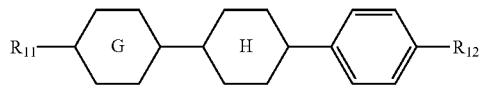

wherein $R_{11}$ and $R_{12}$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more non-neighboring —CH$_2$— groups in the groups represented by $R_{11}$ and $R_{12}$ are each independently optionally substituted with cyclopentylene, cyclobutylene or cyclopropylene;

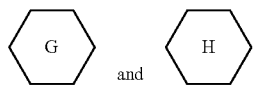

each independently represent

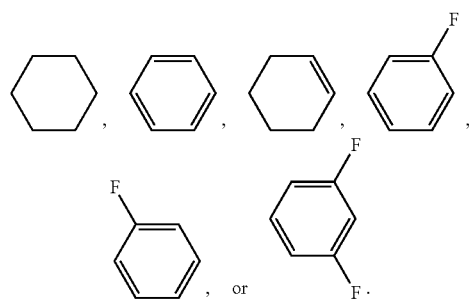

10. The liquid crystal display device according to claim 1, wherein said liquid crystal composition further comprises one or more compounds represented by formula VIII:

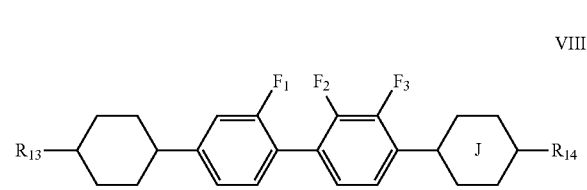

wherein $R_{13}$ and $R_{14}$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8;

represents

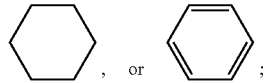

and $F_1$, $F_2$ and $F_3$ each independently represent H or F, with $F_2$ and $F_3$ not simultaneously being F.

* * * * *